US010061576B2

(12) United States Patent
Kurosawa et al.

(10) Patent No.: US 10,061,576 B2
(45) Date of Patent: Aug. 28, 2018

(54) VEHICLE-MOUNTED PROGRAM WRITING DEVICE

(71) Applicant: Hitachi Automotive Systems, Ltd., Hitachinaka-shi, Ibaraki (JP)

(72) Inventors: Kenichi Kurosawa, Hitachinaka (JP); Fumiharu Nakahara, Hitachinaka (JP)

(73) Assignee: Hitachi Automotive Systems, Ltd., Hitachinaka-shi (JP)

(*) Notice: Subject to any disclaimer, the term of this patent is extended or adjusted under 35 U.S.C. 154(b) by 0 days.

(21) Appl. No.: 15/312,088

(22) PCT Filed: Jun. 19, 2015

(86) PCT No.: PCT/JP2015/067673
§ 371 (c)(1),
(2) Date: Nov. 17, 2016

(87) PCT Pub. No.: WO2015/194652
PCT Pub. Date: Dec. 23, 2015

(65) Prior Publication Data
US 2017/0090907 A1    Mar. 30, 2017

(30) Foreign Application Priority Data

Jun. 19, 2014 (JP) ................................. 2014-125884

(51) Int. Cl.
*G06F 8/65* (2018.01)
*G06F 8/654* (2018.01)
(Continued)

(52) U.S. Cl.
CPC ................ *G06F 8/65* (2013.01); *B60R 16/02* (2013.01); *G06F 8/654* (2018.02); *G06F 8/665* (2013.01); *G06F 11/00* (2013.01)

(58) Field of Classification Search
CPC ... G06F 8/60–8/70; G06F 11/00; B60R 16/02
(Continued)

(56) References Cited

U.S. PATENT DOCUMENTS

| 6,249,848 B1 * | 6/2001 | Terada | ...................... | G06F 8/60 |
| | | | | 365/185.33 |
| 8,290,659 B2 * | 10/2012 | Asano | .................. | G08G 1/0104 |
| | | | | 340/905 |

(Continued)

FOREIGN PATENT DOCUMENTS

| EP | 1 434 129 A2 | 6/2004 |
| JP | 2007-11734 A | 1/2007 |

(Continued)

OTHER PUBLICATIONS

Nilsson, D. K., et al., A Framework for Self-Verification of Firmware Updates over the Air in Vehicle ECUs, IEEE Globecom Workshops, 2008, pp. 1-5, [retrieved on Apr. 2, 2018], Retrieved from the Internet: <URL:http://ieeexplore.ieee.org/>.*

(Continued)

*Primary Examiner* — Geoffrey St Leger
(74) *Attorney, Agent, or Firm* — Crowell & Moring LLP

(57) ABSTRACT

A vehicle-mounted program writing device includes a plurality of vehicle-mounted control devices and a relay device. If a write start command button is turned on when a memory storage completion indicator is in an on state, the relay device starts the writing of the updated programs and the updated data to the vehicle-mounted control devices. If the memory storage completion indicator is in off state, the relay device does not execute the writing of the updated programs and the updated data even when the write start command button is turned on.

4 Claims, 22 Drawing Sheets

(51) Int. Cl.
  *G06F 8/656* (2018.01)
  *G06F 11/00* (2006.01)
  *B60R 16/02* (2006.01)
  *G06F 9/445* (2018.01)

(58) Field of Classification Search
  USPC .................................................. 717/168–178
  See application file for complete search history.

(56) References Cited

U.S. PATENT DOCUMENTS

| | | | |
|---|---|---|---|
| 2001/0023374 A1* | 9/2001 | Yashiki | G06F 8/60 700/23 |
| 2001/0049765 A1* | 12/2001 | Matsuura | B60R 16/0232 711/103 |
| 2002/0019877 A1* | 2/2002 | Wrede | G06F 8/61 709/230 |
| 2004/0002793 A1* | 1/2004 | Tachibana | G06F 8/65 701/1 |
| 2006/0130033 A1* | 6/2006 | Stoffels | G06F 8/61 717/166 |
| 2006/0259207 A1 | 11/2006 | Natsume | |
| 2007/0005204 A1 | 1/2007 | Yamamoto et al. | |
| 2007/0100513 A1* | 5/2007 | Asano | G08G 1/0104 701/2 |
| 2007/0185624 A1* | 8/2007 | Duddles | G06F 8/665 701/1 |
| 2010/0262334 A1* | 10/2010 | Yoshiyama | G05B 19/0426 701/31.4 |
| 2013/0151647 A1* | 6/2013 | Tatsumi | G06F 15/167 709/213 |
| 2013/0197712 A1* | 8/2013 | Matsuura | B60R 25/24 701/1 |
| 2014/0380296 A1* | 12/2014 | Pal | G06F 8/65 717/171 |
| 2015/0301822 A1* | 10/2015 | Takahashi | G06F 13/00 717/173 |
| 2015/0347121 A1* | 12/2015 | Harumoto | G01C 21/32 717/172 |
| 2017/0026492 A1* | 1/2017 | Kawamura | B60R 16/02 |

FOREIGN PATENT DOCUMENTS

| | | |
|---|---|---|
| JP | 4361902 B2 | 11/2009 |
| JP | 2010-277432 A | 12/2010 |
| JP | 4593095 B2 | 12/2010 |
| WO | WO 2012/017719 A1 | 2/2012 |

OTHER PUBLICATIONS

Miucic, R., et al., Wireless Reprogramming of Vehicle Electronic Control Units, 5th IEEE Consumer Communications and Networking Conference, 2008, pp. 754-755, [retrieved on Apr. 2, 2018], Retrieved from the Internet: <URL:http://ieeexplore.ieee.org/>.*

International Search Report (PCT/ISA/210) issued in PCT Application No. PCT/JP2015/067673 dated Sep. 1, 2015 with English translation (Two (2) pages).

Japanese-language Written Opinion (PCT/ISA/237) issued in PCT Application No. PCT/JP2015/067673 dated Sep. 1, 2015 (Five (5) pages).

Extended European Search Report issued in counterpart European Application No. 15809141.3 dated Jan. 23, 2018 (Nine (9) pages).

* cited by examiner

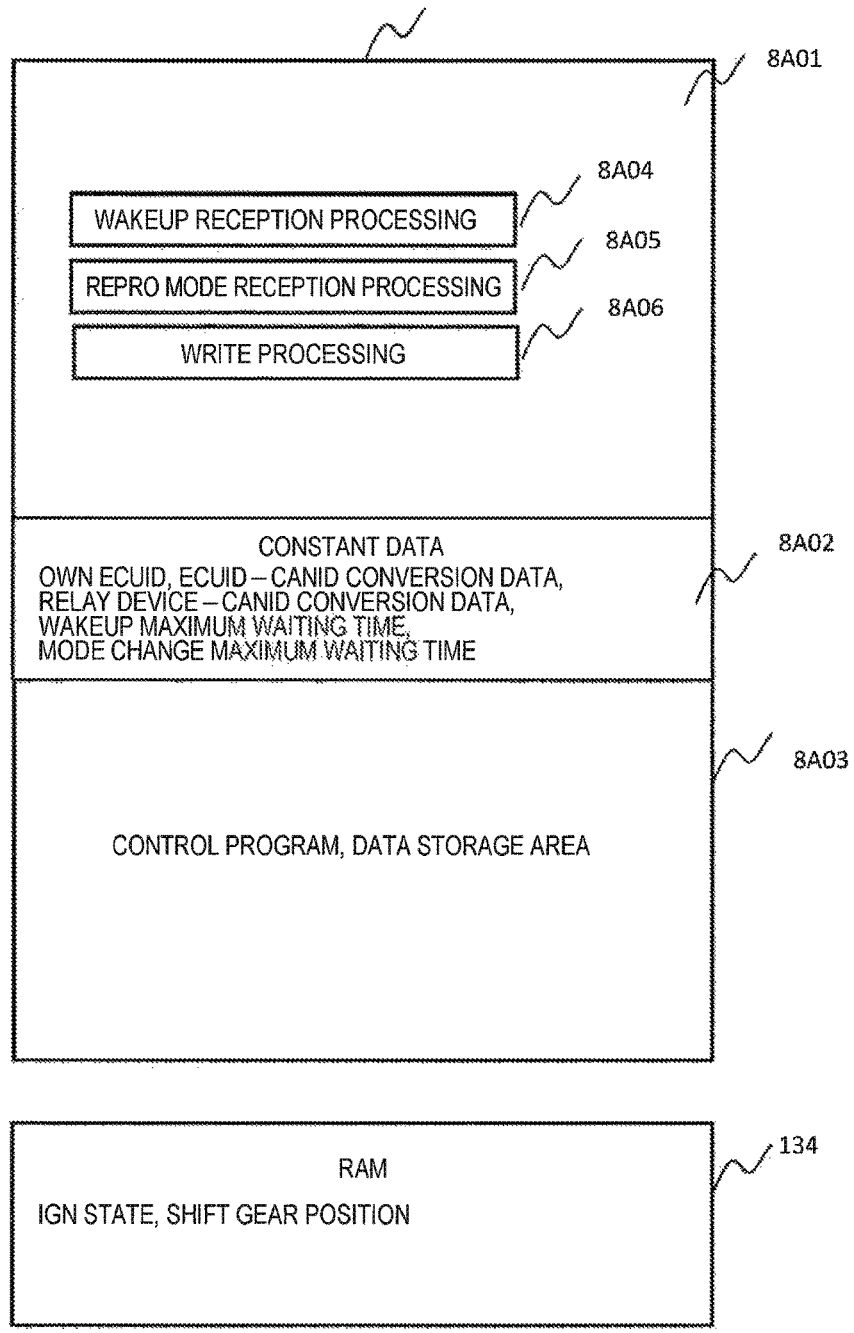

VEHICLE-MOUNTED PROGRAM WRITING DEVICE

TECHNICAL FIELD

The present invention relates to a vehicle-mounted program writing device.

BACKGROUND ART

A control program, in which a control operation of a vehicle-mounted control device mounted on a vehicle is described, is stored in a non-volatile memory such as a flash memory in a microcontroller. Data used in the control program, such as initial values or the like, are also stored in the non-volatile memory. It is usual that these programs or data are not changed after vehicles are shipped to markets. However, upon detection of bugs or for providing a better service, the control program or data is updated.

As for update processing of the control program or data of the vehicle, the vehicle is brought to a dealer and a rewrite is performed therein. However, in recent years, there has been proposed a method of performing update processing through a wireless communication such as a mobile telephone network that is an infrastructure outside the vehicle.

In PLT 1, an information management base station device outside a vehicle transmits an update request to a stopped vehicle through a wireless communication device mounted on the vehicle, and the vehicle receiving the update request wakes up from a sleep state, starts up a vehicle-mounted control device mounted on the vehicle, and writes an updated program transmitted from the information management base station device to the vehicle-mounted control device.

Also, in PLT 2, an external tool and a writing device mounted on a vehicle are connected to each other through a communication cable, an updated program transmitted from the external tool is stored to the writing device, and then, the updated program is written from the writing device to a vehicle-mounted control device in a state in which the communication cable is disconnected therefrom.

CITATION LIST

Patent Literature

PLT 1: Publication of U.S. Pat. No. 4,361,902
PLT 2: Publication of U.S. Pat. No. 4,593,095

SUMMARY OF INVENTION

Technical Problem

In the method of PLT 1, since there is no means to store the updated program in advance, the sum of an updated program transmission time from the information management base station device to the vehicle-mounted control device and a write time to the vehicle-mounted control device is a time required for writing the updated program. Thus, there occurs a problem that it takes a long time to write the updated program. That is, in a case where a driver is in a situation that he or she suddenly wants to drive a vehicle while the updated program is being written, the driver has to wait until the write completion.

In the method of PLT 2, since the communication is not required during writing, the updated program can be stored to the writing device by connecting the communication cable to another vehicle. As a result, a reduction in a write time can be realized in that the write time can be reduced because the writing can be performed without communication with the outside, and in that write processing of the vehicle and the processing of storing the updated program to another vehicle through the communication cable can be performed in parallel. However, conversely, in order for the parallel processing, it is necessary to perform the write processing immediately after the completion of the storage processing with respect to one vehicle. In this regard, the vehicle driver cannot select a time slot when he or she does not use the vehicle or a convenient time slot.

Therefore, an object of the present invention is to update a control program or data of a vehicle-mounted control device while a vehicle owner or a driver using a vehicle does not feel inconvenience.

Solution to Problem

In order to solve the above problems, for example, a configuration described in a scope of the claims is adopted. The present application includes a plurality of means for solving the above problems as follows. A vehicle-mounted program writing device includes: a plurality of vehicle-mounted control devices which control operations of vehicle-mounted devices by using a control program; and a relay device which receives updated program data transmitted from an external center and stores the updated program data in a memory, the updated program data including updated programs and updated data for the vehicle-mounted control devices, wherein the vehicle-mounted control device has a normal operation mode of executing the control program and a repro mode of rewriting the control program to the updated program, the vehicle-mounted control device and the relay device are connected through a vehicle-mounted network, the relay device has a means for receiving the updated programs for the plurality of vehicle-mounted control devices transmitted from the external center before a predetermined first time slot when an ignition is in an on state, and a means for receiving a write start command transmitted from the external center in the first time slot, waking up the vehicle-mounted control devices in the first time slot, and causing a transition to the repro mode, the vehicle-mounted control device notifies the relay device of the transition to the repro mode, and the relay device executes writing of the updated programs and the updated data to the vehicle-mounted control devices in the first time slot on the basis of the notification of the transition to the repro mode from the vehicle-mounted control devices and the presence or absence of the updated program data for the vehicle-mounted control devices which are stored in the memory.

Advantageous Effects of Invention

According to the invention, a vehicle-mounted program writing device that writes an updated program and updated data to a vehicle-mounted control device without a driver's feeling inconvenience can be provided.

Objects, configurations, and effects other than those described above will become apparent from the following descriptions of embodiments.

BRIEF DESCRIPTION OF DRAWINGS

FIG. 8A is a diagram illustrating a memory configuration of a vehicle-mounted control device.

DESCRIPTION OF EMBODIMENTS

Figure 1:
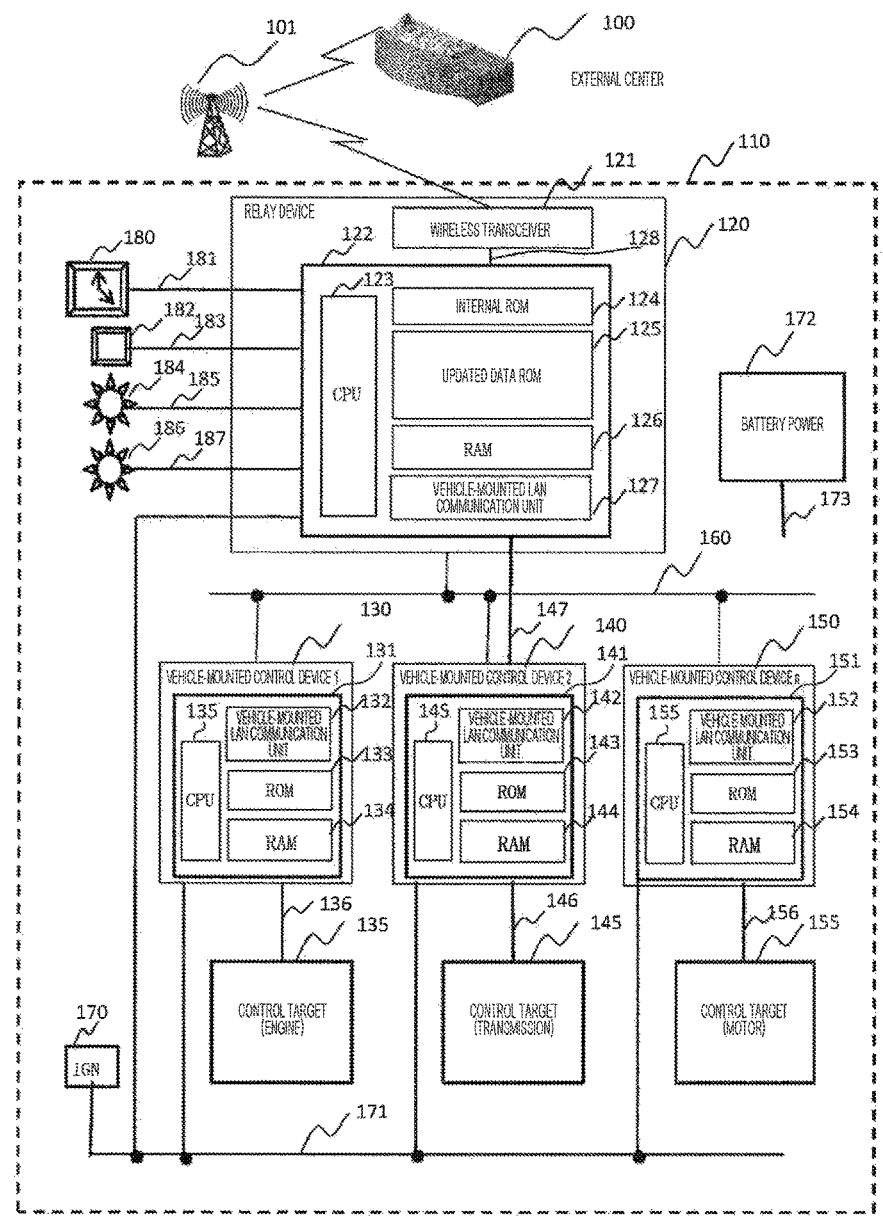
FIG. 1 is a diagram illustrating an overall configuration of a vehicle-mounted program writing device.

In order to make a driver not feel inconvenience, it is necessary to write an updated program or updated data to a vehicle-mounted control device safely and in a short period of time in a time slot when a vehicle is not used. In the present invention, first of all, in order to realize safety and a reduction in a write time, a means for obtaining an updated program data for a vehicle-mounted control device by wireless, which is transmitted from an external center by wireless, when an ignition is in an on state and storing the updated program data to a relay device is assumed. First, since the updated program data is received by wireless, a case where the updated program data cannot be received when a vehicle is stopped at a location which radio waves cannot reach, such as a shade of a building or an indoor parking lot, may be considered. Therefore, receiving the updated program data in the relay device during traveling or the like when the ignition is in an on state is more reliable and safe. Second, the writing from the relay device of the vehicle to the vehicle-mounted control device can more reduce the write time than the direct writing from the external center to the vehicle-mounted control device by wireless.

The present invention is a means which realizes writing of an updated program or updated data to a vehicle-mounted control device in a time slot when a driver does not uses a vehicle. Before describing the means of the present invention, a program update procedure is considered. First, a program update of a vehicle-mounted control device cannot be performed without the consent of a vehicle owner. Thus, it is necessary to confirm consent to the program update or a first time slot when a vehicle is not used, in advance through a telephone or an e-mail. Here, the first time slot is a time slot that is consented to the program update in convenient date designated by a vehicle owner. Therefore, the vehicle owner may want to update the program at a home parking lot in a time slot of 2:00 am to 3:00 am. However, in a case where an external center plans to transmit updated program data to another vehicle in that time slot, the time slot may be changed to another time slot through coordination with a vehicle owner. Also, another vehicle owner may want to update the program by himself or herself in a convenient time slot, without designating a time slot or the like. As such, in the case of designating the time slot, a midnight time slot is expected. Thus, it is necessary to realize writing of an updated program when a driver is not in a vehicle and an ignition is in an off state. This case is defined as a first case. On the other hand, a case where a driver updates the program by himself or herself in a convenient time, without designating a time slot, is defined as a second case. Hereinafter, means for realizing the first case and the second case according to the present invention will be described.

First, the means for realizing the first case will be described. The present means is given on the basis that, since a driver is not in a vehicle, a program update is performed in a time slot desired by a vehicle owner (referred to as a first time slot), based on a command from an external center.

After storing updated program data from an external center to a relay device before a first time slot, the relay device wakes up a vehicle-mounted control device when a write start command transmitted from the external center is received within the first time slot, causes a transition to a repro mode (program rewrite mode), and performs writing of the updated program and updated data to the vehicle-mounted control device in the first time slot, based on a notification of the transition to the repro mode from the vehicle-mounted control device and the presence or absence of the updated program data for the vehicle-mounted control device which are stored in a memory. As a result, the program and data update of the vehicle-mounted control device can be completed in a time slot when a vehicle owner does not feel inconvenience.

The means wakes up the vehicle-mounted control device when the write start command transmitted from the external center within the first time slot is received and the ignition is in an off state, causes a transition to the repro mode (program rewrite mode), and performs writing of the updated program and updated data to the vehicle-mounted control device in the first time slot, based on a notification of the transition to the repro mode from the vehicle-mounted control device and the presence or absence of the updated program data for the vehicle-mounted control device stored in the memory.

The means causes the relay device to automatically perform writing even without receiving the write start command from the external center. That is, the present means can compare the second time slot to perform the writing in the updated program data received from the external center with a time obtained from a clock mounted on the vehicle, determine whether the time is within or out of a range of the second time slot, and perform write start command processing. That is, when the storage of the updated program data in the memory of the relay device is already completed, the means wakes up the vehicle-mounted control device by transmitting a wakeup pattern to the vehicle-mounted control device connected to a vehicle-mounted network, and then, performs writing processing of the updated program and the updated data, after receiving the notification of the transition of the vehicle-mounted control device to the repro mode, by transmitting a command of transition to the repro mode to the vehicle-mounted control device. As described above, the present means can obtain a current time from the clock in the vehicle and keep a promise with the vehicle owner by checking whether the time is within a range of the second time slot. That is, this can be realized by equally setting the first time slot and the second time slot.

The ignition is in an off state is added as a condition for performing the write start command processing.

A memory storage completion indicator is installed in the vehicle and is turned on when the relay device completes the storage of the updated program data transmitted from the external center. In a case where the updated program data was transmitted to the vehicle a few days ago, the indicator is turned on so that the driver can recognize that the preparation of the program update is ready, thereby giving a sense of ease.

A write completion indicator is installed in the vehicle, and the turn-on of the indicator and the write completion notification to the external center are performed after the write completion of the vehicle-mounted control device. Therefore, the driver can feel easy because the driver can confirm the completion, for example, in the next morning if the write completion indictor of the vehicle is turned on. Furthermore, the external center also can know the completion.

Next, the means for realizing the second case will be described. This case is a case where the driver is in the vehicle.

A memory storage completion indicator that allows a driver to confirm the storage completion of the updated program data, a write start command button that allows the driver to instruct a write start command, and a write completion indicator that indicates the write completion are installed, a relay device performs writing to a vehicle-mounted control device when the driver selects the write start command button in a convenient time for the driver after confirming the turn-on of the memory storage completion indicator, and furthermore, the write completion is notified to the driver by turning on the write completion indicator. As such, if there are two indicators and one button, the driver can perform the write operation at ease and reliably.

After an ignition is set to an on state in a convenient time for the driver and a shift gear of the vehicle is set to a parking position, the relay device performs the writing to the vehicle-mounted control device by turning on the write start command button, and furthermore, the write completion is notified to the driver by turning on the write completion indicator. As such, if there are two indicators and one button, the driver can perform the write operation at ease and reliably.

A means is provided for performing writing in a first time slot promised with a driver owner because the driver is not necessarily the owner even if the driver is in the vehicle. The present means is a means wherein, in order to perform the writing in the first time slot promised with the vehicle owner, data of a second time slot (the second time slot is set to be equal to the first time slot) is set to the updated program and is transmitted to the relay device; the relay device uses the clock to check whether the turn-on time of the write start command button is within a range of the second time slot; the relay device performs the writing to the vehicle-mounted control device when it is checked as being within the range and the memory storage completion indicator is turned on; and the relay device notifies the write completion to the driver by turning on the write completion indicator after the write completion.

The relay device uses the clock to check whether the turn-on time of the write start command button is within the range of the second time slot; the relay device performs the writing to the vehicle-mounted control device when it is checked as being within the range, the memory storage completion indicator is turned on, and the shift gear position is the parking position when the ignition is in an on state; and the relay device notifies the write completion to the driver by turning on the write completion indicator after the write completion.

According to the present invention, as described above, even in a case where the driver is in the vehicle or even in the case where the driver is not in the vehicle, the updated program can be written by the means for performing the write start in a promised time slot or by pressing the write start command button in a convenient time.

Hereinafter, embodiments of the present invention will be described with reference to the drawings.

First, a hardware configuration, a software configuration, and a data structure used in the embodiments will be described.

FIG. 1 is a diagram illustrating an overall configuration of a vehicle-mounted program writing device.

An external center 100 has a function of transmitting updated program data to a vehicle 110 by wireless and receiving a write completion result from the vehicle. A radio relay station 101 relays wireless data between the external center 100 and the vehicle 110. The vehicle 110 includes a relay device 120 which has a function of storing the updated program data and dividing and transmitting an updated program and updated data to a vehicle-mounted control device, a vehicle-mounted control device 130 which controls a control target (engine) 135, a vehicle-mounted control device 140 which controls a control target (transmission) 145, a vehicle-mounted control device 150 which controls a control target (motor) 155, a battery power 172 mounted on a vehicle, an ignition switch IGN 170 which supplies the battery power to electronic devices mounted on the vehicle, a clock 180, a write start command button 182, a memory storage completion indicator 184, and a write completion indicator 186. The relay device 120 includes a wireless transceiver 121 which performs data transmission and reception with the external center 100, and a microcontroller 122. Furthermore, the relay device 120 is connected to a vehicle-mounted network 160, is connected to the clock 180 through a signal line 181, is connected to the write start command button 182 through a signal line 183, is connected to the memory storage completion indicator 184 through a signal line 185, and is connected to the write completion indicator 186 through a signal line 187. Here, the write start command button 182, the memory storage completion indicator 184, and the write completion indicator 186 are prepared separately for ease of description, but operation and display may be replaced by a single device such as an indicator with a touch panel. The wireless transceiver 121 is connected to the microcontroller 122 through a signal line 128. The microcontroller 122 includes a CPU 123 with an arithmetic unit, an internal ROM 124 which stores a program for controlling the operation of the microcontroller, an updated data ROM 125 which stores the updated program data, a RAM 126, and a vehicle-mounted LAN communication unit 127 which performs protocol processing of the vehicle-mounted network.

The vehicle-mounted network 160 is a vehicle-mounted network which connects the relay device 120 to the vehicle-mounted control devices 130, 140, and 150. The battery power 172 supplies power through a power line 173 to the entire vehicle electronic devices, such as the relay device 120 or the vehicle-mounted control devices 130, 140, and 150. Also, the ignition 170 is a signal for starting up the vehicle electronic devices and is connected to the relay device 120 and the vehicle-mounted control devices 130, 140, and 150 through a signal line 171. When the ignition 170 is in an on state, the connected electronic devices are started, and when the ignition 170 is in a start state, the engine is started. The vehicle-mounted control device 130 is connected to the vehicle-mounted network 160 and controls the engine 135 being the control target through a signal line 136. A microcontroller 131 controls the operation of the vehicle-mounted control device 130, and a vehicle-mounted LAN communication unit 132 is connected to the vehicle-mounted network 160. A ROM 133 is a flash memory which stores a program and data for controlling the control target 135, and a RAM 134 is an SRAM.

The vehicle-mounted control device 140 is connected to the vehicle-mounted network 160 and controls the transmission 145 being the control target through a signal line 146. A microcontroller 141 controls the operation of the vehicle-mounted control device 140, and a vehicle-mounted LAN communication unit 142 is connected to the vehicle-mounted network 160. A ROM 143 is a flash memory which stores a program and data for controlling the control target 145, and a RAM 144 is an SRAM. The vehicle-mounted control device 140 outputs a shift gear position signal 147 of the transmission to the relay device 121.

The vehicle-mounted control device 150 is connected to the vehicle-mounted network 160 and controls the motor 155 being the control target through a signal line 156. A microcontroller 151 controls the operation of the vehicle-mounted control device 150, and a vehicle-mounted LAN communication unit 152 is connected to the vehicle-mounted network 160. A ROM 153 is a flash memory which stores a program and data for controlling the control target 155, and a RAM 154 is an SRAM.

Figure 2:
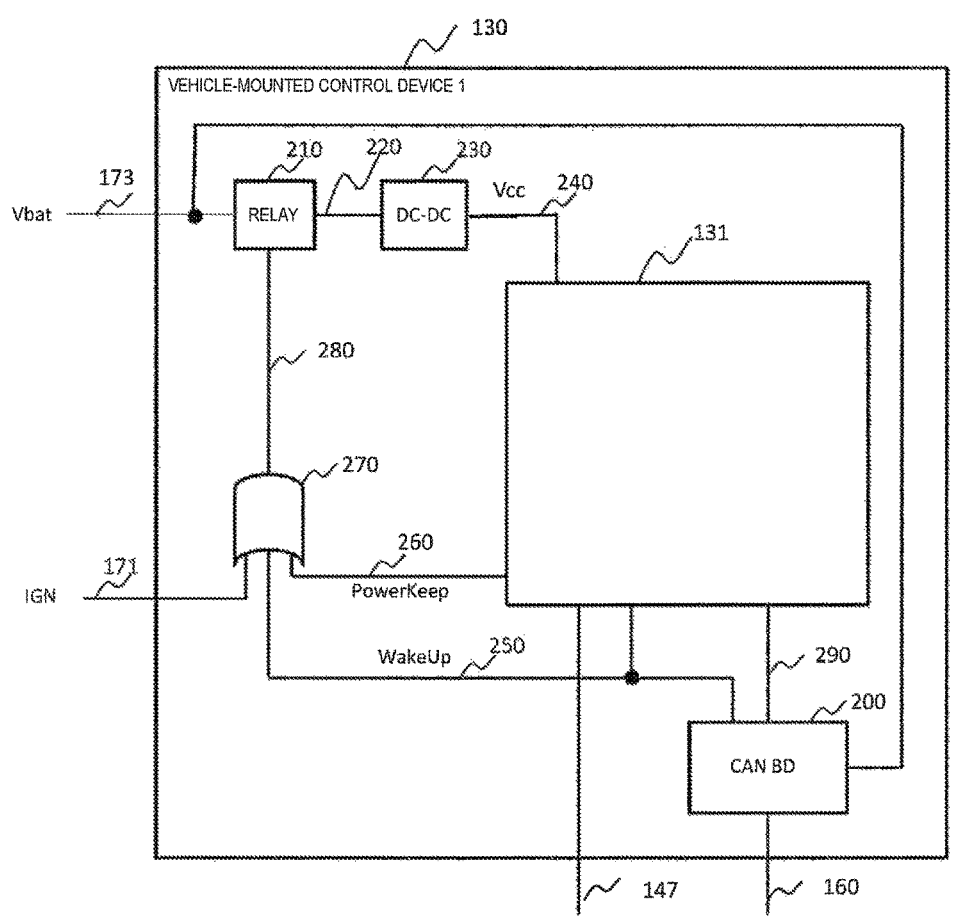
FIG. 2 is a diagram illustrating a configuration of a vehicle-mounted control device.

Next, a circuit related to the start of the vehicle-mounted control device 130 will be described with reference to FIG. 2. In the present embodiment, the vehicle-mounted control device is configured by three devices 130, 140, and 150, but the start-related circuit is the same. Therefore, the descriptions will be collectively given with reference to FIG. 2. In the input of the vehicle-mounted control device 130, there are the battery power line 173, the ignition signal line 171, and the vehicle-mounted network 160. When a relay circuit 210 becomes an on state, the battery power line 173 and a power line 220 are connected to each other and the battery power is supplied to a DC-DC circuit 230. The DC-DC circuit 230 drops a battery voltage to a voltage of the microcontroller and supplies the dropped voltage to a power terminal 240 of the microcontroller. Due to this, the microcontroller 131 can be started by power-on reset. Here, three signals for setting the relay circuit 210 to the on state will be described.

The first signal is an ignition signal IGN 171, the second signal is a wakeup detection signal WakeUp 250 of a driver IC CAN BD 200 of the vehicle-mounted network, and the third signal is a self-holding signal PowerKeep 260 of the microcontroller 131. The three signals are output to a signal 260 through an OR circuit 270 and control the on and off operation of the relay circuit 210. The wakeup detection signal WakeUp 250 is a signal which becomes an on state when a wakeup signal is received through the vehicle-mounted network 160. The wakeup function is a function commonly used in vehicles and also supports a CAN network or a FlexRay network. Also, the signal line 290 is a signal which connects the driver IC CAN BD 200 of the vehicle-mounted network to the microcontroller 131, and is a signal line which performs exchange of communication data.

Next, the self-holding signal PowerKeep 260 will be described. When the microcontroller 131 sets the signal to an on state, the relay circuit 210 can maintain an on state from the circuit configuration even when the ignition signal IGN 171 and the wakeup detection signal WakeUp 250 are in an off state. Therefore, when the updated program is written to the flash memory, if this signal is set to an on state, the power of the microcontroller can be maintained to thereby secure safety. Only the shift gear position signal 147 is output from the vehicle-mounted control device 140 to the relay device 120. The other vehicle-mounted control devices 130 and 150 do not output.

Figure 3:
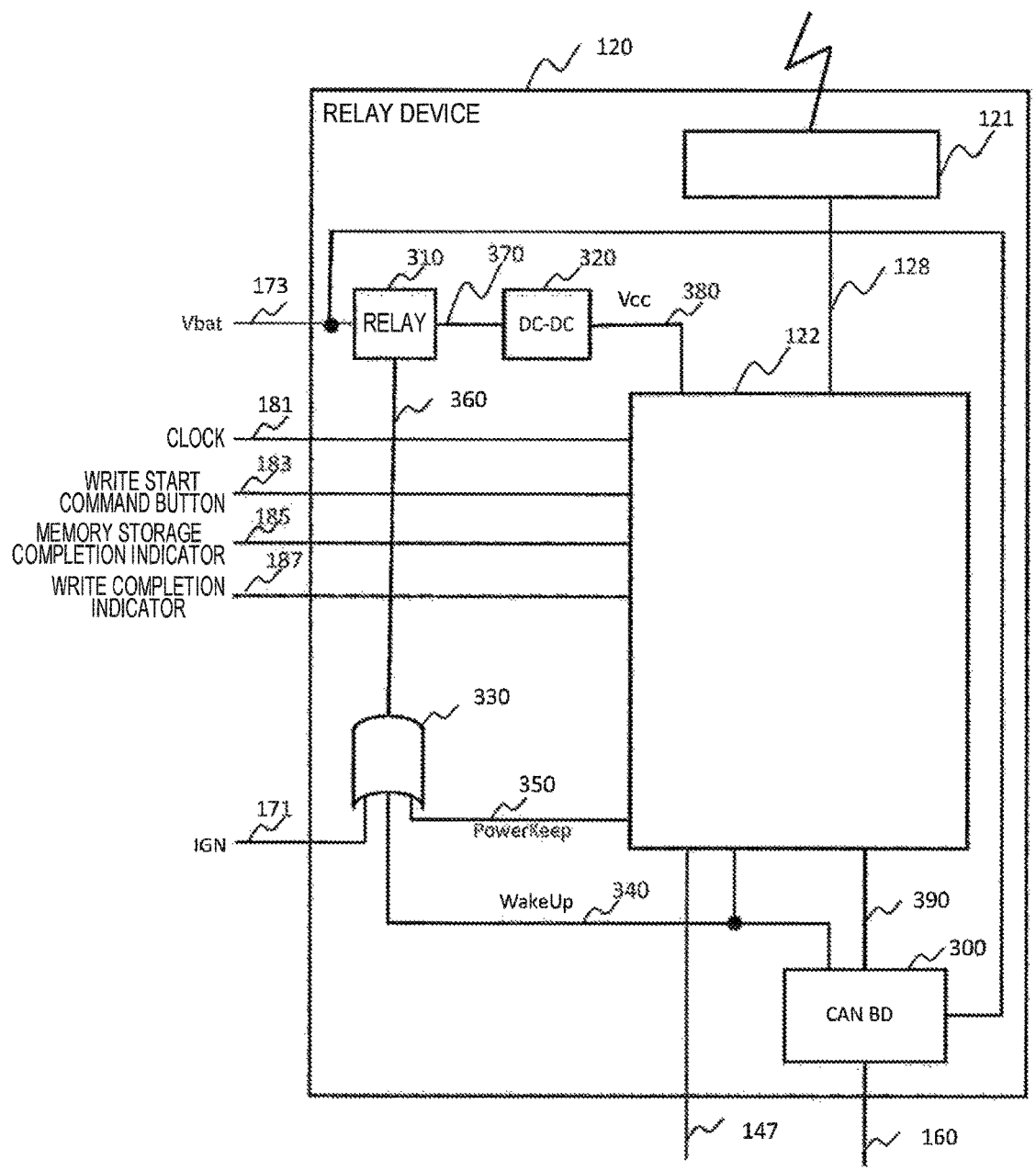
FIG. 3 is a diagram illustrating a configuration of a relay device.

Next, a circuit related to the start of the relay device 120 will be described with reference to FIG. 3. In the input of the relay device 120, there are the battery power line 173, the signal line 181 of the clock, the signal line 183 of the write start command button, the signal line 185 of the memory storage completion indicator, the signal line 187 of the write completion indicator, the ignition signal line 171, the shift gear position signal 147, and the vehicle-mounted network 160. Also, the wireless transceiver 121 is connected to the microcontroller 122 through the signal line 128. When a relay circuit 310 becomes an on state, the battery power line 173 and a power line 370 are connected to each other and the battery power is supplied to a DC-DC circuit 320. The DC-DC circuit 320 drops a battery voltage to a voltage of the microcontroller and supplies the dropped voltage to a power terminal 380 of the microcontroller. Due to this, the microcontroller 122 can be started by power-on reset. Here, as in the vehicle-mounted control device, three signals for setting the relay circuit 310 to the on state will be described.

The first signal is an ignition signal 171, the second signal is a wakeup detection signal WakeUp 340 of a driver IC CAN BD 300 of the vehicle-mounted network, and the third signal is a self-holding signal PowerKeep 350 of the microcontroller 122. The three signals are output to a signal 360 through an OR circuit 330 and control the on and off operation of the relay circuit 310. The wakeup detection signal WakeUp 340 is a signal which becomes an on state when a wakeup signal is received through the vehicle-mounted network 160. The wakeup function is a function commonly used in vehicles. Also, a signal line 390 is a signal which connects the driver IC CAN BD 300 of the vehicle-mounted network to the microcontroller 122, and is a signal line which performs exchange of communication data.

Next, the self-holding signal PowerKeep 350 will be described. When the microcontroller 122 sets the signal to an on state, the relay circuit 310 can maintain an on state from the circuit configuration even when the ignition signal 171 and the wakeup detection signal WakeUp 340 are in an off state. Therefore, when the updated program is written to the flash memory, if this signal is set to an on state, the power of the microcontroller 122 can be maintained to thereby secure safety.

Figure 4:
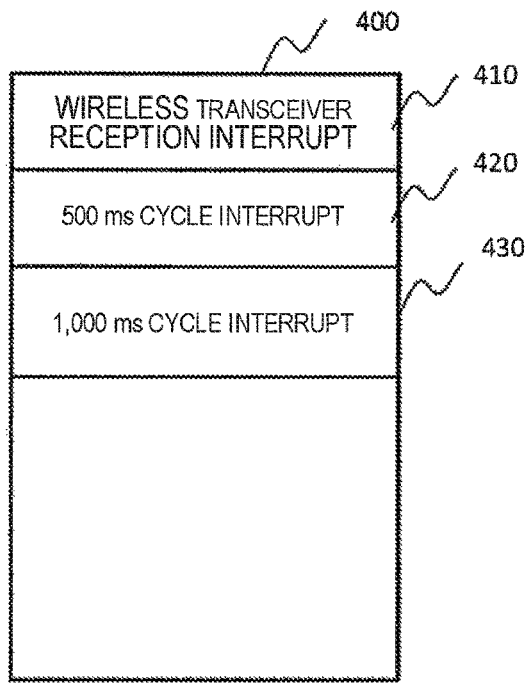
FIG. 4 is an interrupt table of a relay device microcontroller.

Next, an interrupt table configuration of the microcontroller of the relay device is shown in FIG. 4.

Figure 14:
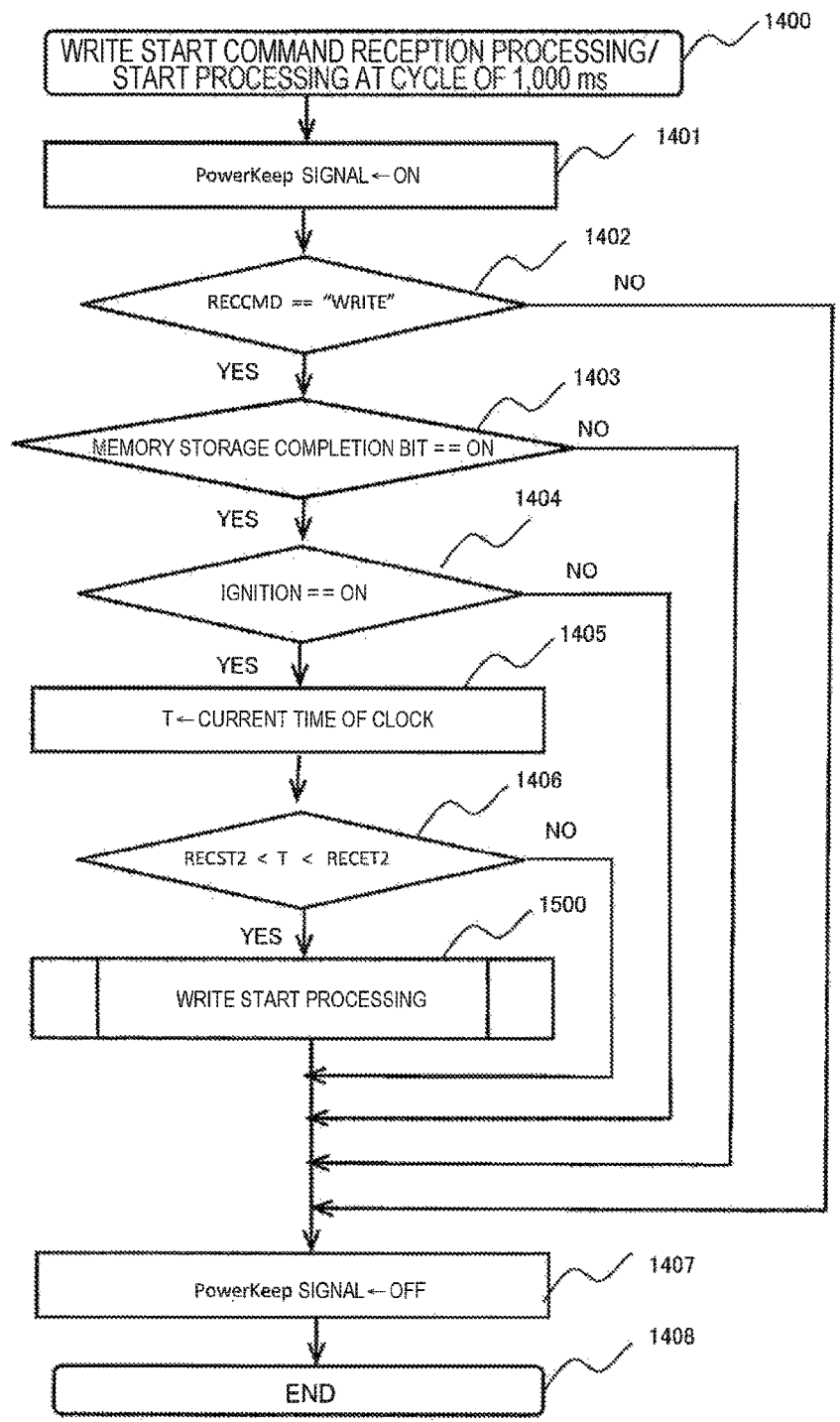
FIG. 14 is a flowchart showing write start command reception processing.

An interrupt table 400 is a table in which interrupts generated inside or outside the microcontroller are branched to addresses registered in the present table. In the relay device, an address 410 of a memory storage processing program (see FIG. 11) of the relay device which performs processing when the updated program data is received from the wireless transceiver, an address 420 of a 500 ms cycle interrupt program for checking whether the write start command button is pressed, and an address 430 of a write start command reception processing program (see FIG. 14) started at a cycle of 1,000 ms are set. It should be noted that the write start command reception processing program of FIG. 14 is started from the memory storage processing program of the relay device of FIG. 11.

Figure 5:
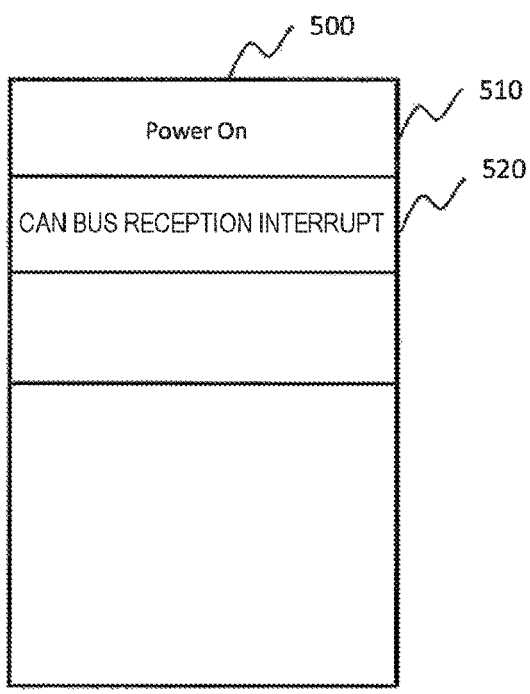
FIG. 5 is an interrupt table of a vehicle-mounted control device microcontroller.

Interrupt table configurations of the microcontrollers of the vehicle-mounted control devices 130, 140, and 150 are shown in FIG. 5. Since the interrupt tables of the vehicle-mounted control devices are all the same, the descriptions will be collectively given.

Figure 16:
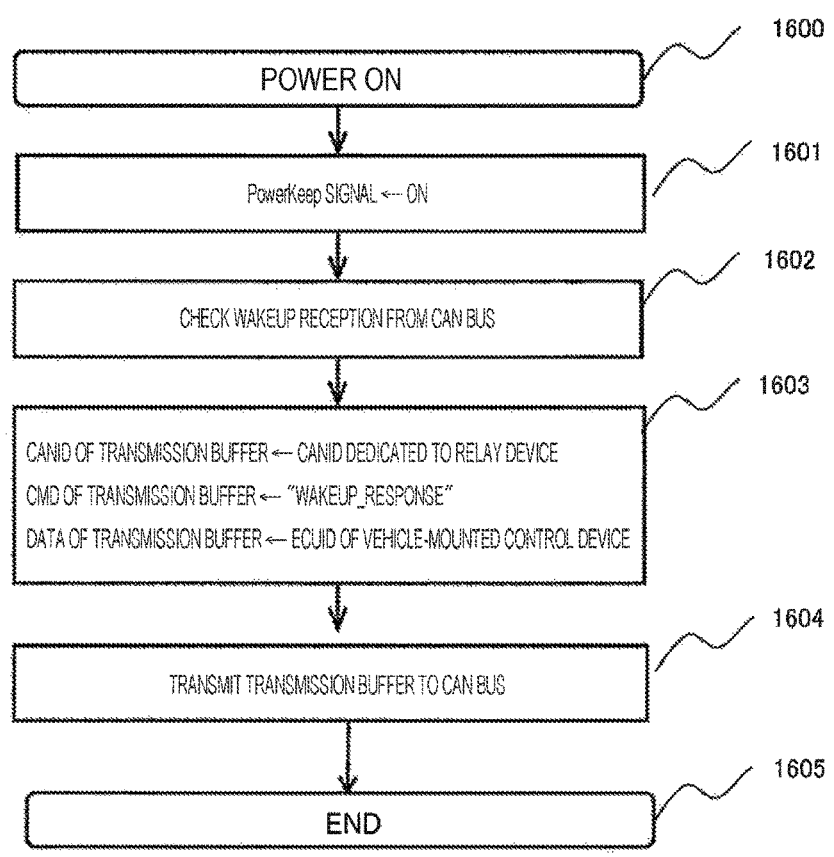
FIG. 16 is a flowchart showing wakeup reception processing of a vehicle-mounted control device.
Figure 19:
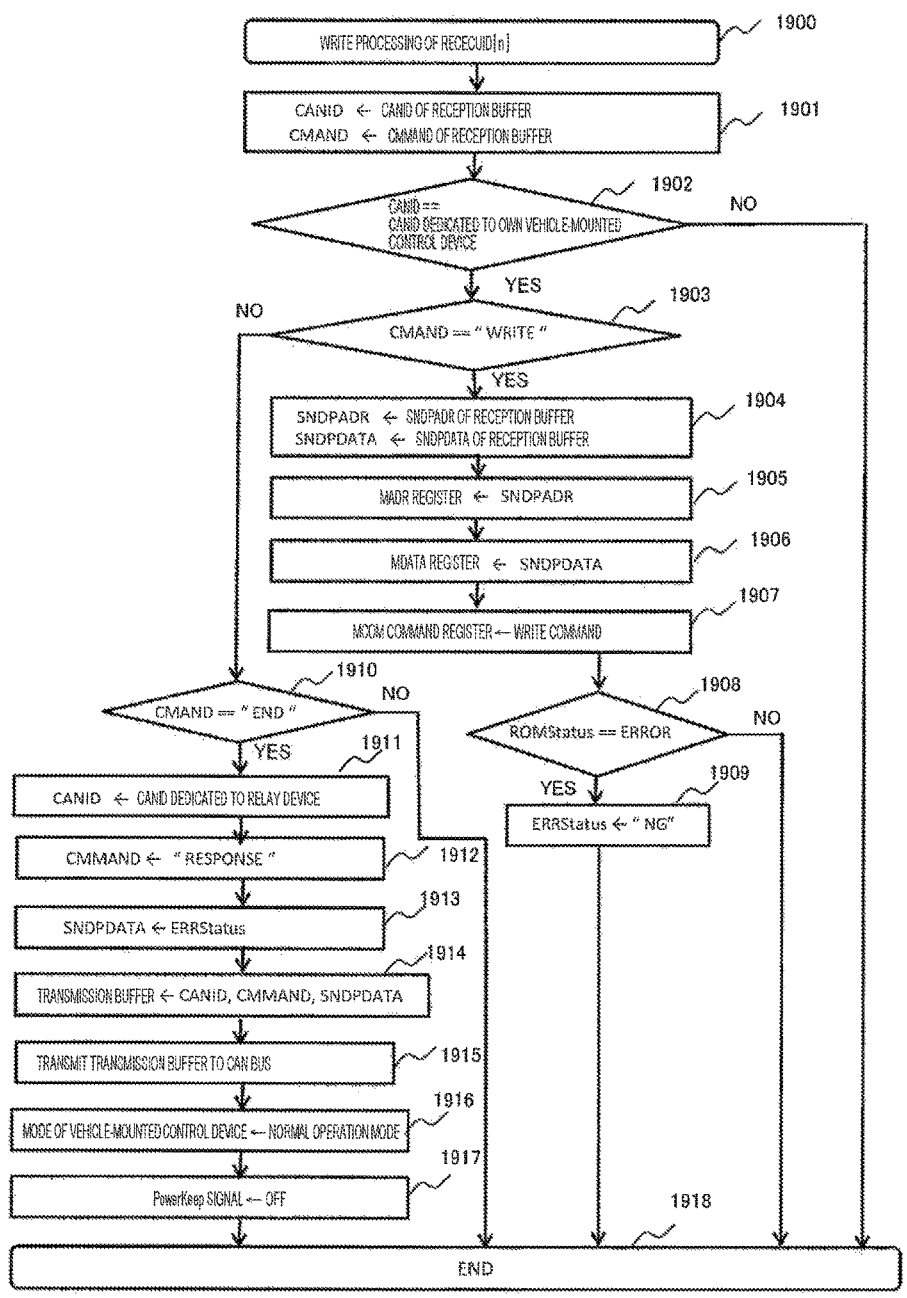
FIG. 19 is a flowchart showing write processing of a vehicle-mounted control device indicated by a vehicle-mounted control device number RECECUID[n].

An interrupt table 500 is a table in which interrupts generated inside or outside the microcontroller are branched to addresses registered in the present table. As described above, in the vehicle-mounted control device, the power of the microcontroller is turned on when the ignition IGN is turned on or when the wakeup pattern is received from the vehicle-mounted network. An address of a program to be performed when the power is turned on is registered in 510. Due to this, a wakeup reception processing program of the vehicle-mounted control device of FIG. 16 is started. An address of a program to be performed when the updated program and the updated data are received from the relay device is registered in 520. Due to this, a write processing program of RECECUID[n] of FIG. 19 is started.

Figure 6:
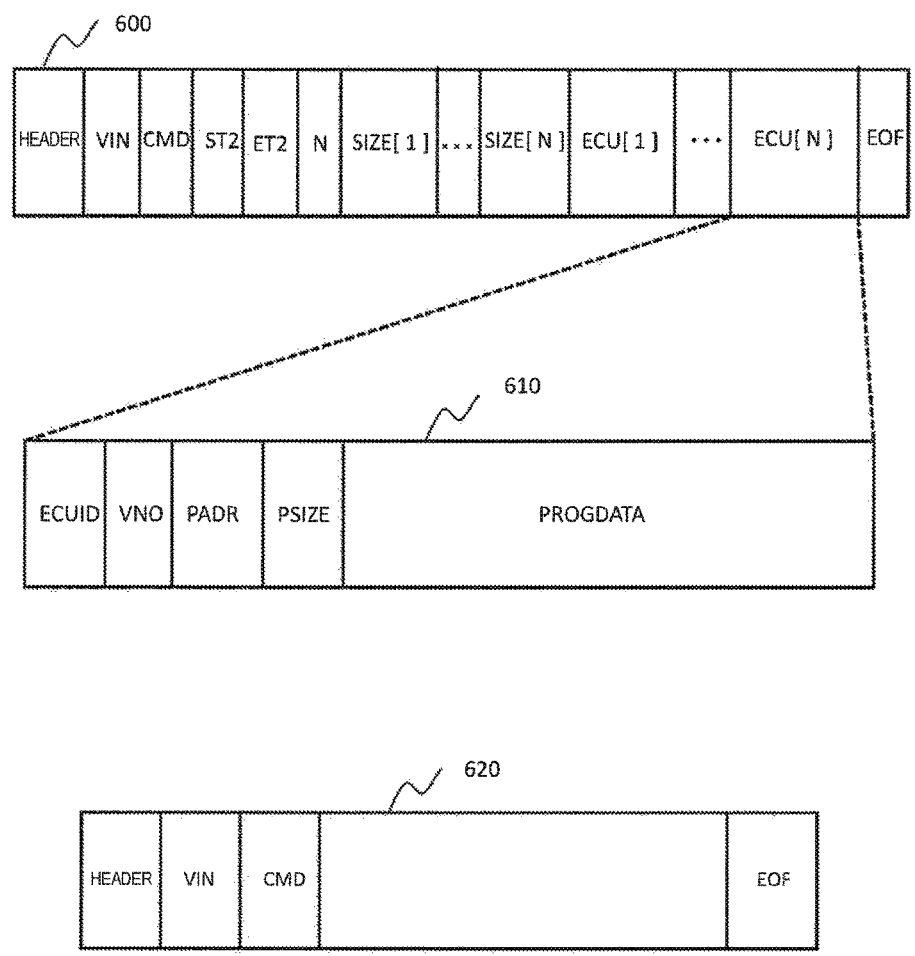
FIG. 6 is a diagram illustrating a transmitted data structure of an external center.

Next, a transmitted data structure transmitted by the external center 100 is shown in FIG. 6.

600 is a transmitted data structure of the updated program data, and 620 is a transmitted data structure of the write start command. A header of the transmitted data 600 is information indicating the start of transmission, and VIN is a vehicle number which uniquely identifies a vehicle. CMD is a type of command. When CMD is "SNDPROG", received data means the updated program data, and when CMD is "WRITE", received data means the write start command. ST2 is a start time of the second time slot, and ET2 is an end time of the second time slot. N indicates the number of transmitted updated program data. SIZE[1] is a size of updated program data to be transmitted for the first time and is expressed in units of bytes. SIZE[N] is a size of updated program data to be transmitted for the last time.

Next, ECU[1] is updated program data information to be transmitted at the first time, and ECU[N] is updated program data information to be transmitted at the last time. The number of updated program data information is also equal to N. EOF is information indicating the end of transmitted data.

Next, an internal data structure 610 of ECU[N] will be described. Since ECU[N] has the same internal data structure as other ECU[1] and the like, ECU[N] will be collectively described. In the present embodiment, the updated program data of ECU[N] includes an updated program, updated data, and management information. First, ECUID is a vehicle-mounted control device number which uniquely identifies the vehicle-mounted control device in the vehicle. VNO is a version number of the updated program and the updated data, and PADR is a write address of the ROM of the vehicle-mounted control device. This is a head address required when the updated program and the updated data are written to the ROM. PSIZE is a size of the updated program and the updated data. The unit of the size is a byte. PROGDATA is an updated program and updated data body. Next, the transmitted data structure 620 of the write start command will be described. VIN is a vehicle number which uniquely identifies a vehicle, and CMD is a write start command. 620 is necessary information.

Figure 7:
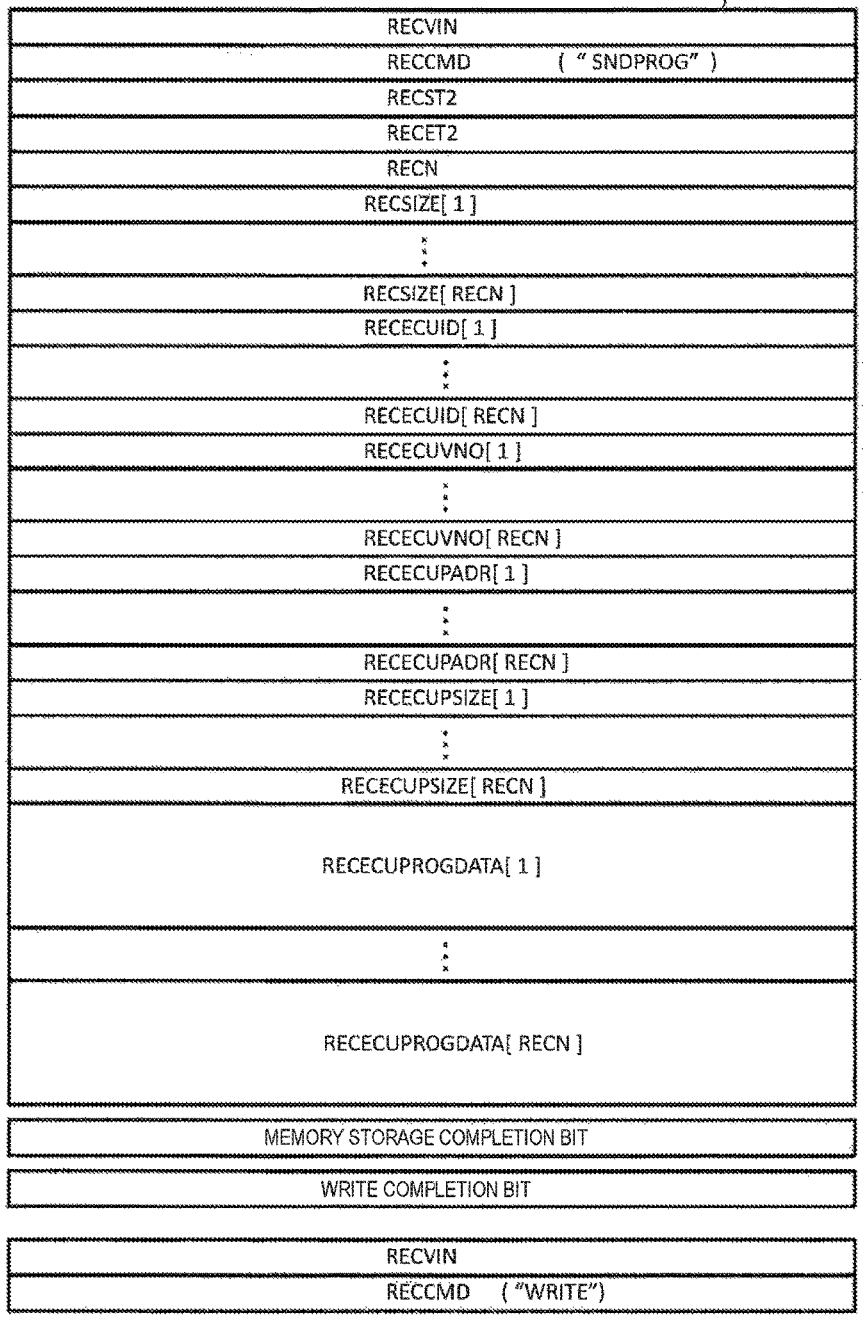
FIG. 7 is a diagram illustrating a stored data structure of a relay device.

Next, a data structure which the relay device 120 receives from the external center and stored will be described with reference to FIG. 7. As can be seen from FIG. 7, a stored data structure 700 is similar to the structure of FIG. 6 excluding the header and the EOF. First, RECVIN is a variable which holds received data VIN, and RECCMD is a variable which holds received data CMD, and a case where updated program data is received is "SNDPROG". RECST2 is a variable which holds received data ST2, RECET2 is a variable which holds received data ET2, RECN is a variable which holds received data N, RECSIZE[1] to RECSIZE[RECN] are an array which holds received data SIZE[1] to SIZE[N], RECECUID[1] to RECECUID[RECN] are an array which holds received data ECUID[1] to ECUID[N], and RECECUVNO[1] to RECECUVNO[RECN] are an array which holds received data ECUVNO[1] to ECUVNO[N]. RECECUPADR[1] to RECECUPADR[RECN] are an array which holds received data ECUPADR[1] to ECUPADR[N], RECECUPSIZE[1] to RECECUPSIZE[RECN] are an array which holds received data ECUPSIZE[1] to ECUPSIZE[N], and RECECUPROGDATA[1] to RECECUPROGDATA[REN] are an array which holds received data ECUPROGDATA[1] to ECUPROGDATA[N]. Next, a memory storage completion bit is set to be turned on after the storage completion in the memory storage processing. A write completion bit is set when the entire updated program and updated data have been completely written to the vehicle-mounted control devices.

Next, RECVIN and RECCMD "WRITE" are variables which respectively hold received data VIN and CMD "WRITE" when the write start command is received from the external center.

The variables and the arrays described above are stored in the updated data ROM 125 of FIG. 1. Therefore, these data are held without disappearing even when the power of the microcontroller 122 is turned off.

Figure 8:
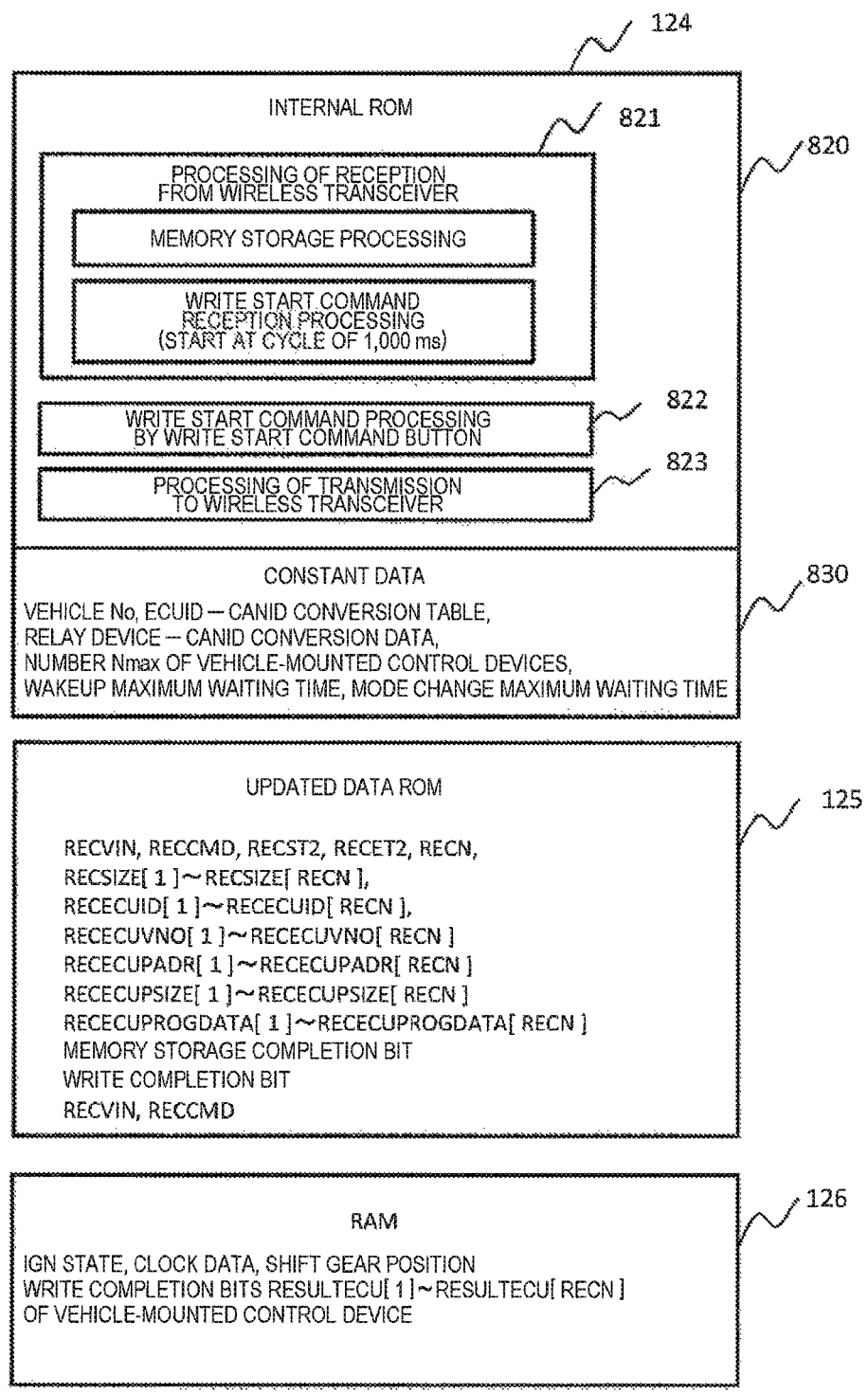
FIG. 8 is a diagram illustrating a memory configuration of a relay device.

Next, a memory configuration of the relay device as illustrated in FIG. 8 will be described. In the internal ROM 124, the memory storage processing program and the write start command reception processing program are stored in a reception processing program 821 from the wireless transceiver started from the wireless transceiver 121 via the interrupt 410. The write start command reception processing program is also a program started at a cycle of 1,000 ms . Also, a write start command processing program 822 by a write start command button and a processing program 823 of transmission to a wireless transceiver are also stored. Also, in a constant data area 830, there is a vehicle number which uniquely identifies a corresponding vehicle or an ECUID and CANID conversion table which uniquely identifies a vehicle-mounted control device mounted on a vehicle. In the present embodiment, when the updated program for the vehicle-mounted control device is transmitted to a specific vehicle-mounted control device through a vehicle-mounted network CAN, a specific CANID is designated and transmitted. That is, the vehicle-mounted control device can receive only transmitted data to which the specific CANID is designated.

As such, communication between the relay device and the vehicle-mounted control device can be enabled by assigning a different CANID to each vehicle-mounted control device. Therefore, the ECUID and CANID conversion table which uniquely identifies the vehicle-mounted control device is stored in the constant data area 830. Similarly, in a case where a dedicated CANID is also assigned to the relay device and the vehicle-mounted control device transmits transmitted data to the relay device, it is only necessary to designate and transmit the CANID dedicated to the relay device. Also, the number Nmax of vehicle-mounted control devices mounted on the corresponding vehicle, a wakeup maximum waiting time, or a mode change maximum waiting time is also stored. The wakeup maximum waiting time is a maximum time required until the entire vehicle-mounted control devices are started and can transmit responses to the vehicle-mounted network, when the relay device starts the vehicle-mounted control device in a case where the ignition is in an off state. Therefore, after transmitting the wakeup pattern to the vehicle-mounted network, the relay device can surely confirm the responses from the entire vehicle-mounted control devices by checking the reception buffer after the elapse of the wakeup maximum waiting time. The wakeup starts not the specific vehicle-mounted control device alone but the entire vehicle-mounted control devices. Similarly, the mode change maximum waiting time also can be a maximum time required until a reply meaning the completion of the mode change is returned to the designated vehicle-mounted network, when the relay device transmits the mode change, such as a repro mode, to the vehicle-mounted network. Since the transmission of the mode change designates CANID, the mode of only the specific vehicle-mounted control device is changed. Next, the updated data ROM 125 is a flash memory which stores data received from the external center. The stored data 700 of FIG. 7 is stored. The RAM 126 is a work area used by the program of the internal ROM 820, and the IGN state or clock data, data such as the shift gear position, and the like are read therefrom. The RAM 126 is configured by an SRAM. The state of the ignition or the data of the clock, and the write completion bits RESULTECU[1] to RESULTECU[REC] of the vehicle-mounted control device are stored during the execution of the program.

FIG. 8A illustrates the memory configuration of the vehicle-mounted control device. In the present embodiment, since the entire vehicle-mounted control devices have the same memory configuration, the following description will be given with reference to FIG. 8A. In the ROM 133, a wakeup reception processing program 8A04 of receiving the updated program and the updated data, a repro mode reception processing program 8A05 of receiving a repro mode command, and a write processing program 8A06 of writing the updated program and the updated data to an area 8A03 are stored in a program area 8A01 of the ROM 133. In a constant data area 8A02, own ECUID which uniquely identifies the vehicle-mounted control device itself, CANID conversion data pared with ECUID, relay device ECUID used upon transmission to the relay device, CANID conversion data thereof, a wakeup maximum waiting time, and a mode change maximum waiting time are stored. The RAM 134 is a work area used during the execution of the programs 8A04, 8A05, and 8A06, such as the state of the ignition. However, only the vehicle-mounted control device 140 holds shift gear position information.

Figure 9:
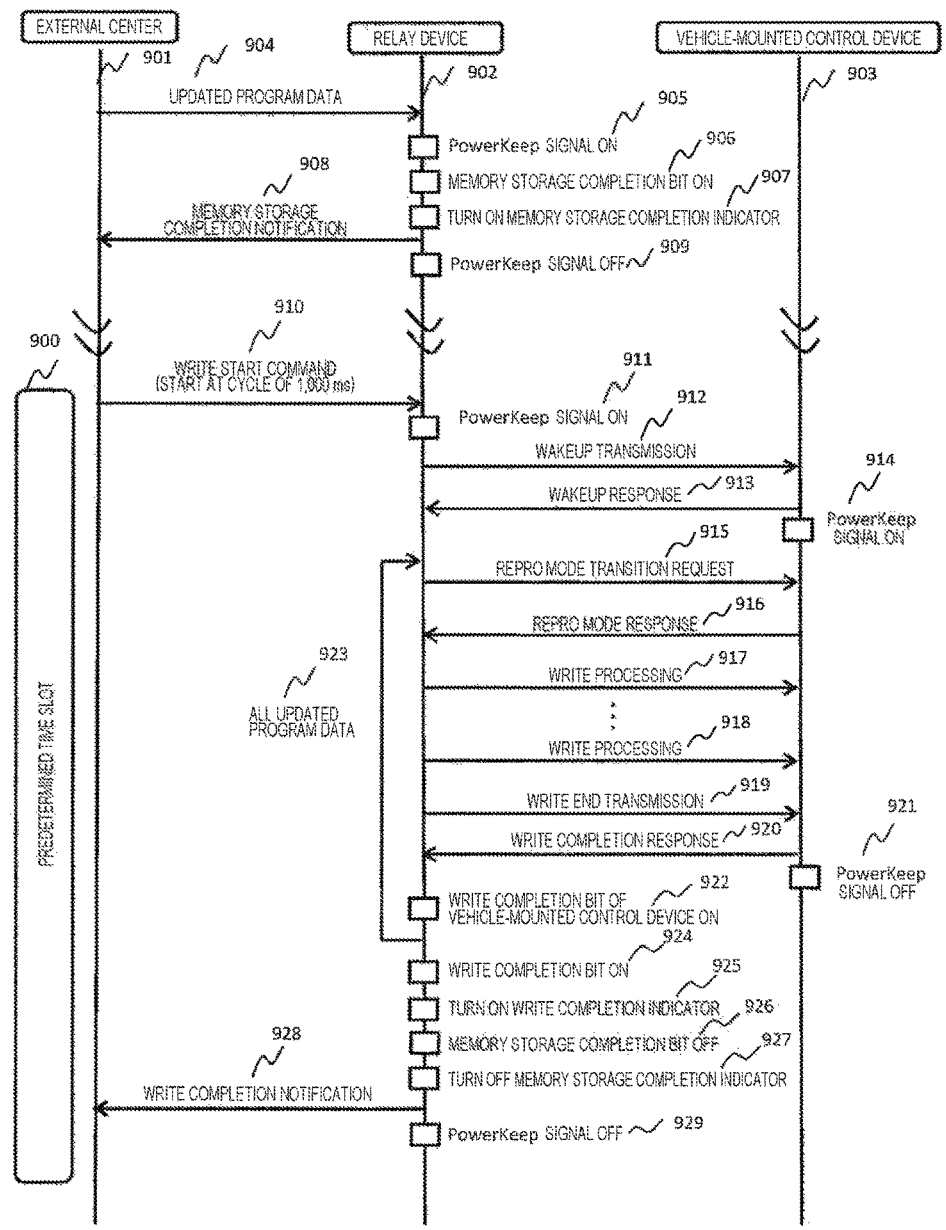
FIG. 9 is a diagram illustrating an overview of write processing by a write start command of an external center.
Figure 10:
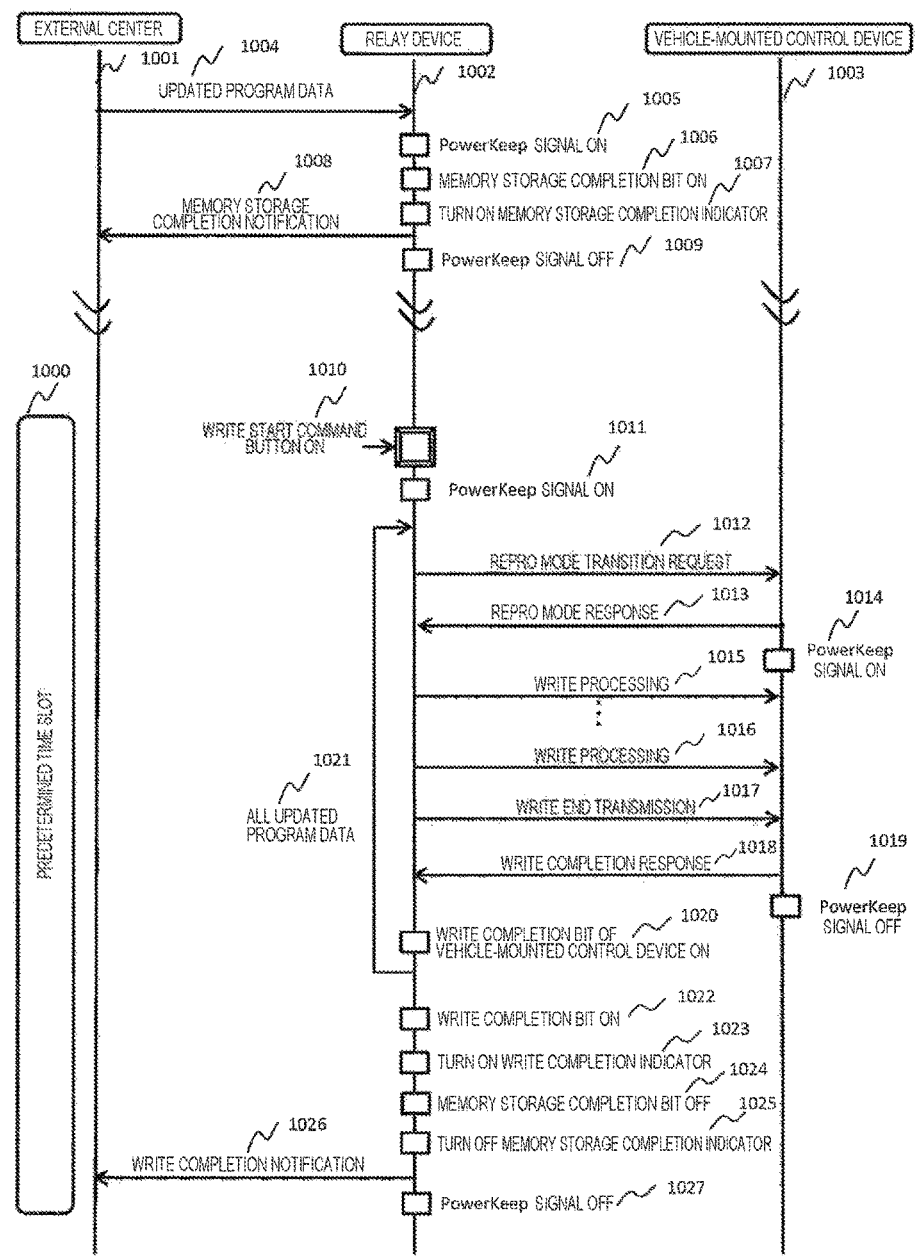
FIG. 10 is a diagram illustrating an overview of write processing by a write button.

On the assumption of the above-described configuration, the overview of the processing of the present invention is shown in FIGS. 9 and 10.

First, the background from a time point when a program update is found to execution of update processing will be considered. When bugs or improvement points in a vehicle-mounted control program are found in a vehicle manufacturer, an updated program and updated data are created. Then, the description of the failure and the improvement contents are notified in writing to a vehicle owner through a dealer or the like. After that, in order to implement measures, the dealer confirms the approval of the program update to the vehicle owner by telephone, explains that the driver cannot drive the vehicle in a time slot when the writing of the updated program is performed, gets an approval of it, asks a time slot of a convenient date when the program update of the vehicle is performed, and informs the external center of the time slot. As such, in order to make the vehicle owner not feel inconvenience, it is important to update the program in a time slot of a day convenient for the vehicle owner.

In order to write the updated program data to the vehicle of the owner in the notified time slot, the external center needs to transmit and store the updated program data to the relay device of the vehicle of the owner before the notified time slot. The above background realized by a processing flow of FIG. 9.

On the other hand, when the updated program data is stored in the vehicle-mounted relay device, the driver may want to perform the program update in a convenient timing, without waiting for the write start command from the external center. This case realized by a processing flow of FIG. 10. However, since the driver is not necessarily the owner of the vehicle, if the owner designates the time slot, it is necessary to suppress the writing out of the range of the time slot. Hereinafter, details will be omitted and the overview will be described with reference to FIGS. 9 and 10.

FIG. 9 illustrates the overview of the write processing by the write start command of the external center. However, a case where the write start command is previously entered into the updated program data and then transmitted is also included.

The overview of the processing of the external center, the relay device, and the vehicle-mounted control device will be described with reference to the time axes 901, 902, and 903 thereof.

First, the external center transmits updated program data 904 to the relay device in a time slot prior to a predetermined time slot promised with a vehicle owner. The relay device performs reception when an ignition is in an on state. In order to secure the power of the relay device at the beginning, a PowerKeep signal is turned on in 905, and the updated program data is stored in the updated data ROM. Then, a memory storage completion bit is turned on in 906, and a memory storage completion indicator is turned on in 907. Then, a memory storage completion notification 908 to the external device is performed, and the PowerKeep signal is turned off in 909. After the above processing is completed, the external device transmits a write start command 910 to the relay device in the predetermined time slot. It is autonomously determined from a vehicle-mounted clock whether a current time is an already received second time slot, without receiving the write start command. The relay device turns on the PowerKeep signal 911 and transmits a wakeup pattern to the vehicle-mounted control device in 912. Since the power is turned on when the wakeup pattern is received, the vehicle-mounted control device executes the program and turns on the PowerKeep signal in 914. After a wakeup response 913 is received from the vehicle-mounted control device, a repro mode transition request 915 is transmitted to the vehicle-mounted control device to which the program update is requested. It is confirmed that a repro mode response 916 is returned from the vehicle-mounted control device, and the updated program and the updated data are divided and the write processing 917 to 918 is repeatedly transmitted. After the updated program and the updated data for the vehicle-mounted control devices have been completely transmitted, a write end is transmitted in 919. When the vehicle-mounted control device receives the write end, the vehicle-mounted control device transmits a write completion response 920 to the relay device and then turns off the PowerKeep signal in 921. When the write completion response 920 is returned from the vehicle-mounted control device, the updated program and updated data processing of the vehicle-mounted control device is completed. Therefore, the relay device turns on a write completion bit of the vehicle-mounted control device in 922. Then, when there are updated program data for other vehicle-mounted control devices, processing 923 of transmitting all updated programs and updated data to the vehicle-mounted control devices is repeated. After that, when the writing is successful in all the vehicle-mounted control devices (OK), the write completion bit is turned on in 924, a write completion indicator is turned on in 925, a memory storage completion bit is turned off in 926, a memory storage completion indicator is turned off in 927, and a write completion notification 928 is notified to the external center. Then, the PowerKeep signal is turned off in 929 to end the processing. The overview of the present processing is a brief overview, and a case where a malfunction occurs in the vehicle-mounted control device is a write failure. Therefore, it is necessary to notify the external center of the write failure, but this will be described in the following detailed processing flow.

Next, the overview of the processing of the present invention will be described with reference to the overview of write processing by a write button as shown in FIG. 10.

FIG. 10 illustrates the overview of the processing of the external center, the relay device, and the vehicle-mounted control device. The overview of the processing of the external center, the relay device, and the vehicle-mounted control device will be described with reference to the time axes 1001, 1002, and 1003 thereof.

First, when a time slot promised with a vehicle owner is predetermined, the external center transmits updated program data 1004 to the relay device in a time slot prior to the predetermined time slot. However, it is not always necessary to determine a second time slot in advance with the vehicle owner. It is necessary to determine the second time slot. The relay device performs reception when an ignition is in an on state. In order to secure the power of the relay device at the beginning, a PowerKeep signal is turned on in 1005, and the updated program data is stored in the updated data ROM. Then, a memory storage completion bit is turned on in 1006, and a memory storage completion indicator is turned on in 1007, so as to notify the memory storage completion. Then, a memory storage completion notification 1008 to the external device is performed, and the PowerKeep signal is turned off in 1009. The above processing is the same as that of FIG. 9, but the following processing is different from that of FIG. 9. First, the driver confirms whether the memory storage completion indicator is turned on, turns on the ignition, sets the shift gear to the parking position, and executes the write start command by turning on the write start command button connected to the relay device. If the memory storage completion, indicator is turned off, if the ignition is in an off state or if the shift gear is in a position other than the parking, the writing is not executed even when the write start command button is pressed. Here, a processing flow when the condition is satisfied will be described. First, after checking that the button is pressed, the relay device turns on the PowerKeep signal 1011, so as to secure its own power. Then, the relay device transmits a repro mode transition request 1012 to the vehicle-mounted control device to which a program update is requested. After the transition to the repro mode, the vehicle-mounted control device transmits a repro mode response 1013 to the relay device and turns on the PowerKeep signal 1014. The relay device confirms that the repro mode response 1013 is returned from the vehicle-mounted control device, divides an updated program and updated data, and repeatedly transmits write processing 1015 to 1016. After the updated program and the updated data for the vehicle-mounted control devices have been completely transmitted, a write end notification is transmitted in 1017. When the vehicle-mounted control device receives the write end notification 1017, the vehicle-mounted control device transmits a write completion response 1018 to the relay device after changing from the repro mode to a normal operation mode, and then, turns off the PowerKeep signal 1019. When the write completion response 1018 is returned from the vehicle-mounted control device, the updated program and updated data processing of the vehicle-mounted control device is completed. Therefore, the relay device turns on a write completion bit of the vehicle-mounted control device 1020. Then, when there are updated program data for other vehicle-mounted control devices, processing 1021 of transmitting all updated programs and updated data to the vehicle-mounted control devices is repeated. After that, when the writing is successful in all the vehicle-mounted control devices (OK), the write completion bit is turned on in 1022, a write completion indicator is turned on 1023, a memory storage completion bit is turned off in 1024, a memory storage completion indicator is turned off in 1025, and a write completion notification 1026 is notified to the external center. Then, the PowerKeep signal is turned off in 1027 to end the processing. The present processing is a brief overview, and a case where a malfunction occurs in the vehicle-mounted control device is a write failure. Therefore, it is necessary to notify the external center of the write failure, but this will be described in the following detailed processing flow.

Figure 11:
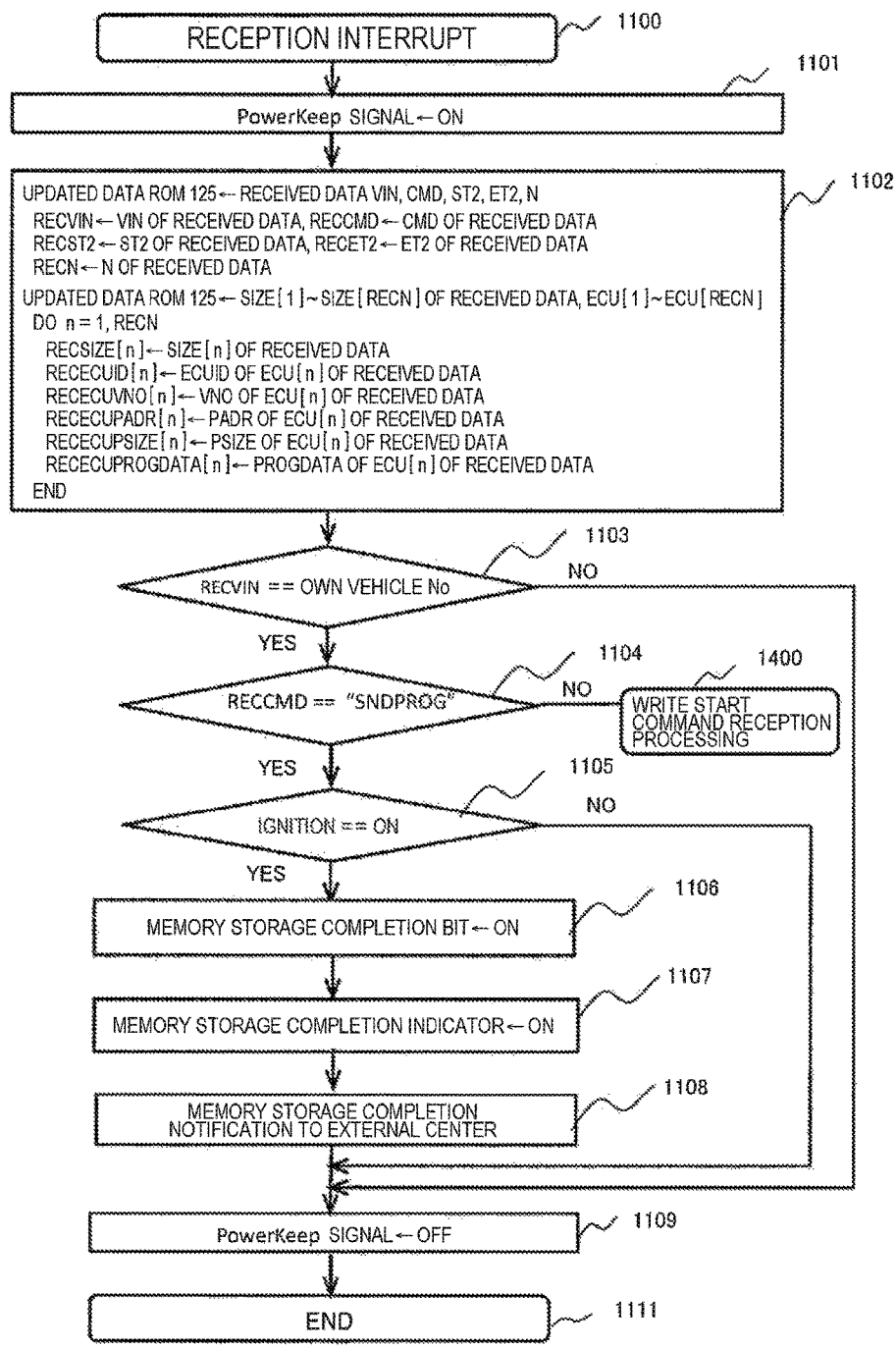
FIG. 11 is a diagram illustrating memory storage processing of a relay device.

Next, details of the memory storage processing, which is the common processing in FIGS. 9 and 10, will be described with reference to memory storage processing of the relay device of FIG. 11. First, when a reception interrupt 1100 from the wireless transceiver is input to the microcontroller, the present program is started. A PowerKeep signal of the relay device is turned on in 1101, and then, the process 1102 for storing the received data in the updated data ROM is executed. The processing contents are to convert data 600 of FIG. 6 into stored data 700 of FIG. 7 and store the data 700 to the updated data ROM. Details are as follows.

VIN of the own vehicle No of the received data is written to variable RECVIN of the updated data ROM.

CMD of the command of the received data is written to variable RECCMD of the updated data ROM.

The start time ST2 of the second time slot of the received data is written to variable RECST2 of the updated data ROM.

The end time ET2 of the second time slot of the received data is written to variable RECET2 of the updated data ROM.

The number N of the updated program data of the received data is written to variable RECN of the updated data ROM.

The received data sizes SIZE[1] to SIZE[RECN] of the received data are written to the array RECSIZE[1] to RECSIZE[RECN] of the updated data ROM.

The vehicle-mounted control device numbers ECUID[1] to ECUID[RECN] of the received data are written to the array RECECUID[1] to RECECUID[RECN] of the updated data ROM.

The versions VNO[1] to VNO[RECN] of the updated program and the updated data of the received data are written to the array RECECUVNO[1] to RECECUVNO[RECN] of the updated data ROM.

The write head addresses PADR[1] to PADR[RECN] of the updated program and the updated data of the received data are written to the array RECECUPADR[1] to RECECUPADR[RECN] of the updated data ROM.

The updated program and updated data sizes PSIZE[1] to PSIZE[RECN] of the received data are written to the array RECECUPSIZE[1] to RECECUPSIZE[RECN] of the updated data ROM.

The updated program and updated data body PROGDATA[1] to PROGDATA[RECN] of the received data are written to the array RECECUPROGDATA[1] to RECECUPROGDATA[RECN] of the updated data ROM.

Here, it should be noted that the vehicle-mounted control device number to be updated is stored in RECECUID[n] (n=1 to RECN) and that the updated program and the updated data to the ROM of the vehicle-mounted control device at the write head address is stored in RECECUPADR[n] (n=1 to RECN). Also, RECST2 and RECET2 are unnecessary information in some embodiments, and are necessary information in some other embodiments.

Then, in 1103, in order to determine whether the received data is data transmitted to the own vehicle, it is checked whether RECVIN is matched with the vehicle No stored in the constant data area of the internal ROM 124. If not matched, a PowerKeep signal of 1109 is turned off to end the processing. If matched, the data is data received to the corresponding vehicle, and thus, it is checked whether RECCMD of 1104 is "SNDPROG". If not matched, RECCMD is another command, and thus, write start command processing of 1400 is performed. If matched, the received data is the updated program data, and thus, it is checked in 1105 whether the ignition of the vehicle is in an on state. If not matched, the PowerKeep signal of 1109 is turned off to end the processing so as to wait until next transmission from the external center. If matched, a memory storage completion bit is turned on in 1106, a memory storage completion indicator is turned on in 1107, a memory storage completion notification to the external center is performed in 1108, and the PowerKeep signal is turned off in 1109 to end the processing. Here, the memory storage completion notification to the external center is performed by transferring the notification data to the processing program 823 of transmission to the wireless transceiver. Here, the write start command reception processing of 1400 is performed when the write start command "WRITE" is received from the external center. However, the write start command is not received, and thus, the write start command reception processing of 1400 is not performed. As shown in FIG. 14, the write start command reception processing is started at a cycle of 1,000 ms and is periodically performed.

The memory storage completion processing has been described above in detail.

Figure 12:
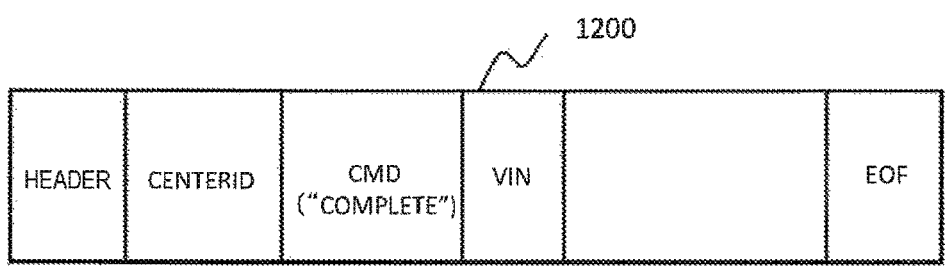
FIG. 12 is a diagram illustrating a transmitted data structure of write completion notification transmitted to an external center.

Next, the transmission data structure of the write start command transmitted from the external center in the predetermined time slot will be described with reference to 620 of FIG. 6. The header of 620 is information indicating the start of transmission, and VIN is the vehicle number which uniquely identifies the vehicle. CMD is the write start command. EOF is information indicating the end of transmission. Here, when CMD is "SNDPROG", the received data means the updated program data, and when CMD is "WRITE", the received data means the write start command. Here, since the received data is the write start command, CMD is "WRITE" command. As such, data subsequent to CMD is greatly different in the "SNDPROG" command and the "WRITE" command Next, the transmitted data structure of the write completion notification transmitted to the external center after the write completion by the relay device will be described with reference to FIG. 12. In 1200, CENTERID means an external center number for uniquely identifying the external center, and CMD is a command which means the write completion or incompletion. "COMPLETE" is a write completion, and "INCOMPLETE" is a notification of a write incompletion. VIN is a vehicle number for uniquely identifying the vehicle.

Figure 13:
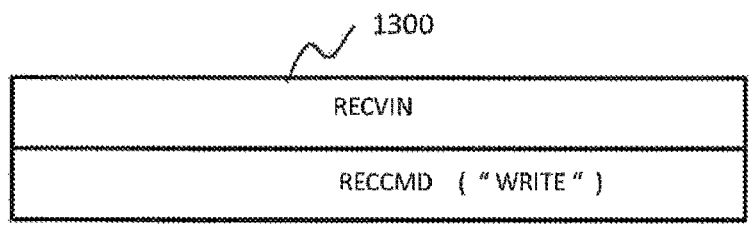
FIG. 13 is a diagram illustrating a stored data structure of a write start command of a relay device.

FIG. 13 illustrates a stored data structure 1300 of the write start command of the relay device. The same configuration is described at the end of FIG. 7. RECVIN and RECCMD, except for the header and EOF, are held in the updated data ROM. However, the data structure illustrated in FIG. 13 is not required. This is because, the second time slot has already been received, and the driver can freely perform execution by the write start button.

Next, the write processing in a case where the write start command is received from the external center and a case where the write start is determined at a cycle of 1,000 ms will be described in detail with reference to FIGS. 14 through 21. The write start command is started by a branch from the write start command reception processing of 1400 of FIG. 11 or a start at a cycle of 1,000 ms.

The write start command reception processing will be described in detail with reference to FIG. 14. First, 1400 is executed when the write start command is received from the external center or when the processing is started at a cycle of 1,000 ms. In 1401, a PowerKeep signal is turned on so as to confirm the power of the relay device. Then, 1402 is executed in some of the embodiments. In other embodiments, they are ignored and 1403 is executed. If not matched in 1402, a PowerKeep signal of 1407 is turned off to end the processing. If matched, the command is the write start command, and thus, 1403 is executed. In 1403, it is checked whether a memory storage completion bit is turned on. If not turned on, the PowerKeep signal of 1407 is turned off to end the processing. If turned on, operations are different according to the embodiments, and these will be described below.

In one embodiment, if 1403 is YES, 1404, 1405, and 1406 are omitted, and the write start processing of 1500 and the PowerKeep signal of 1407 is turned off to end the processing.

In one embodiment, if 1403 is YES, it is checked whether the ignition of 1404 is turned off, and if No, the PowerKeep signal of 1407 is turned off to end the processing. If YES, 1405 and 1406 are omitted and 1500 is executed.

In one embodiment, 1404 is omitted and 1405 and 1406 are executed. If 1406 is YES, 11500 is executed.

In one embodiment, 1404 is executed, and if YES, 1405 and 1406 are executed. In 1405, the current time of the clock is set to variable T, and a determination of RECST2<T<RECET2 of 1406 is executed. If NO, there is no predetermined time slot, and thus, the PowerKeep signal of 1407 is turned off to end the processing. If YES, it is within a range of the predetermined time slot, and thus, the write start processing of 1500 is executed. In 1500, the write start processing is executed, and then, the PowerKeep signal of 1407 is turned off to end the processing. As such, in some embodiments, it should be noted that, after checking that the memory storage completion bit is turned on, whether to refer to the state of the ignition or the second time slot is different. In each embodiment, when the entire conditions are satisfied, the write start processing 1500 is executed.

Next, the write start processing of 1500 will be described in detail with reference to FIG. 15.

Figure 17:
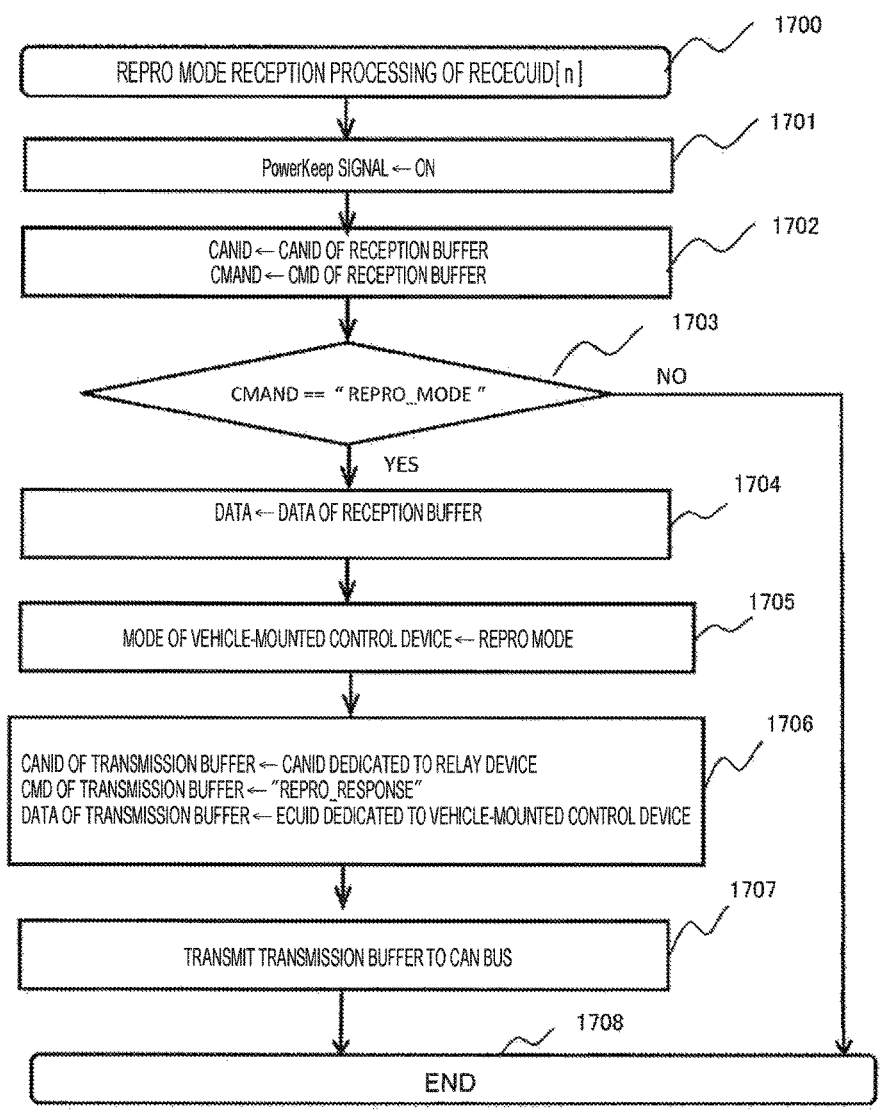
FIG. 17 is a flowchart showing repro mode reception processing of a vehicle-mounted control device indicated by a vehicle-mounted control device number RECECUID[n].

First, in order to start the entire vehicle-mounted control devices, a wakeup pattern is transmitted to a CAN bus of a vehicle-mounted network in 1501. Then, a wakeup maximum waiting time is set to variable WKMAXTIME in 1502, and a determination sentence WKMAXTIME>elapsed time is determined in 1503. The determination sentence is to secure a time for waiting for the wakeup reception indicating that the power of the vehicle-mounted control device receiving the wakeup pattern is turned on and thus the vehicle-mounted control device is started. If YES in 1503, it means that it is within the maximum waiting time and there may exist a vehicle-mounted control device which is not yet started. Therefore, after waiting until NO is determined, processing of 1504 is executed. That is, 1504 is executed in a state in which the entire vehicle-mounted control devices are started. Although in the middle of the processing of FIG. 15, the operation of the vehicle-mounted control device receiving the wakeup pattern will be described with reference to wakeup reception processing of the vehicle-mounted control device as shown in FIG. 16. First, when the wakeup pattern is received, as described above, the powers of the entire vehicle-mounted control devices are turned on in 1600. Then, a PowerKeep signal is turned on in 1601, and the wakeup reception from the CAN bus is checked by the wakeup signal in 1602. That is, if the wakeup signal is on, it can be known that the own start cause is the wakeup. Then, in 1603, CANID dedicated to the relay device is set to a CANID field of a transmission buffer, "WAKEUP RESPONSE" is set to a CMD field of the transmission buffer, and ECUID of the vehicle-mounted control device itself is set to a DATA field of the transmission buffer. Then, in 1604, the contents of the transmission buffer are transmitted to the CAN bus and the processing is ended. As such, the vehicle-mounted control device notifies the relay device of its own start completion through the CAN bus. Next, the description will be returned back to 1504 of FIG. 15. That is, after the entire vehicle-mounted control devices are started, the vehicle-mounted control device to be updated is set to a repro mode. Therefore, the processing of setting the vehicle-mounted control device of RECECUID[n] (n=1) to be updated to the repro mode is performed. In 1504, 1 is set to variable n. In 1505, CANID dedicated to RECECUID[n] is set to the CANID field of the transmission buffer, "REPRO_MODE" meaning a repro mode command is set to the CMD field of the transmission buffer, ECUID dedicated to the relay device is set to the DATA field of the transmission buffer, and the transmission buffer is transmitted to the CAN bus. Then, in 1506, a mode change maximum waiting time is set to variable REPROMAXTIME. Then, in 1507, in order to wait for a response from a vehicle-mounted control device number RECECUID[n], it waits until the elapsed time exceeds the maximum time. If the elapsed time exceeds the maximum time, it is determined as NO. Therefore, in 1508, processing of examining the data received from the vehicle-mounted control device RECECU[n] is performed. Here, although in the middle of the processing of FIG. 15, the operation of the vehicle-mounted control device of the vehicle-mounted control device number RECECUID[n], which receives the repro mode, will be described with reference to repro mode reception processing of RECECUID[n] as shown in FIG. 17. First, in 1701, the PowerKeep signal is turned on. Since the PowerKeep signal is already on at the time of wakeup, there is no effect, but there is no influence if the PowerKeep signal is turned on many times. Then, in 1702, data of a CANID field of a reception buffer is set to variable CANID, and data of a CMD field of the reception buffer is set to variable CMAND. Then, in 1703, it is determined whether variable CMAND is "REPRO_MODE". If NO, the processing is ended, and if YES, data of a DATA field of the reception buffer is set to variable DATA in 1704. Then, in 1705, the vehicle-mounted control device is set to the repro mode. In 1706, in order to notify the relay device of the setting to the repro mode, CANID dedicated to the relay device is set to the CANID field of the transmission buffer, "REPRO_RESPONSE" meaning a repro mode setting completion is set to the CMD field of the transmission buffer, and ECUID of the vehicle-mounted control device itself is set to the DATA field of the transmission buffer. Then, in 1707, the repro mode setting completion is notified to the relay device by transmitting the transmission buffer to the CAN bus. The description of the vehicle-mounted control device with reference to FIG. 17 is ended, and the description of the relay device will be returned back to 1508 of FIG. 15. In 1508, the data of the CANID field of the reception buffer is set to variable CANID, the data of the CMD field of the reception buffer is set to variable CMD, and the data of the DATA field of the reception buffer is set to variable DATA. Then, in 1509, it is checked whether variable CMD is "REPRO_RESPONSE". Here, if YES, processing of transmitting the updated program to the vehicle-mounted control device of RECECUID[n] is performed in 1800. If NO, the vehicle-mounted control device of RECECUID[n] is abnormal. Thus, in 1510, "NG" is set to a write completion bit array RESULTECU[n] of the vehicle-mounted control device. Then, in 1511, it is checked whether variable n is matched with RECN. If NO, in 1512, n is incremented and the execution of 1505 is repeated again.

That is, in 1511, it is checked whether the entire received updated program and updated data have been completely transmitted to the corresponding vehicle-mounted control devices. If YES, write completion processing is performed in 2100 and the processing is ended.

Next, the processing 1800 of transmitting the updated program to RECECUID[n] will be described in detail with reference to FIG. 18. Also, the write completion processing 2100 will be subsequently described.

Figure 18:
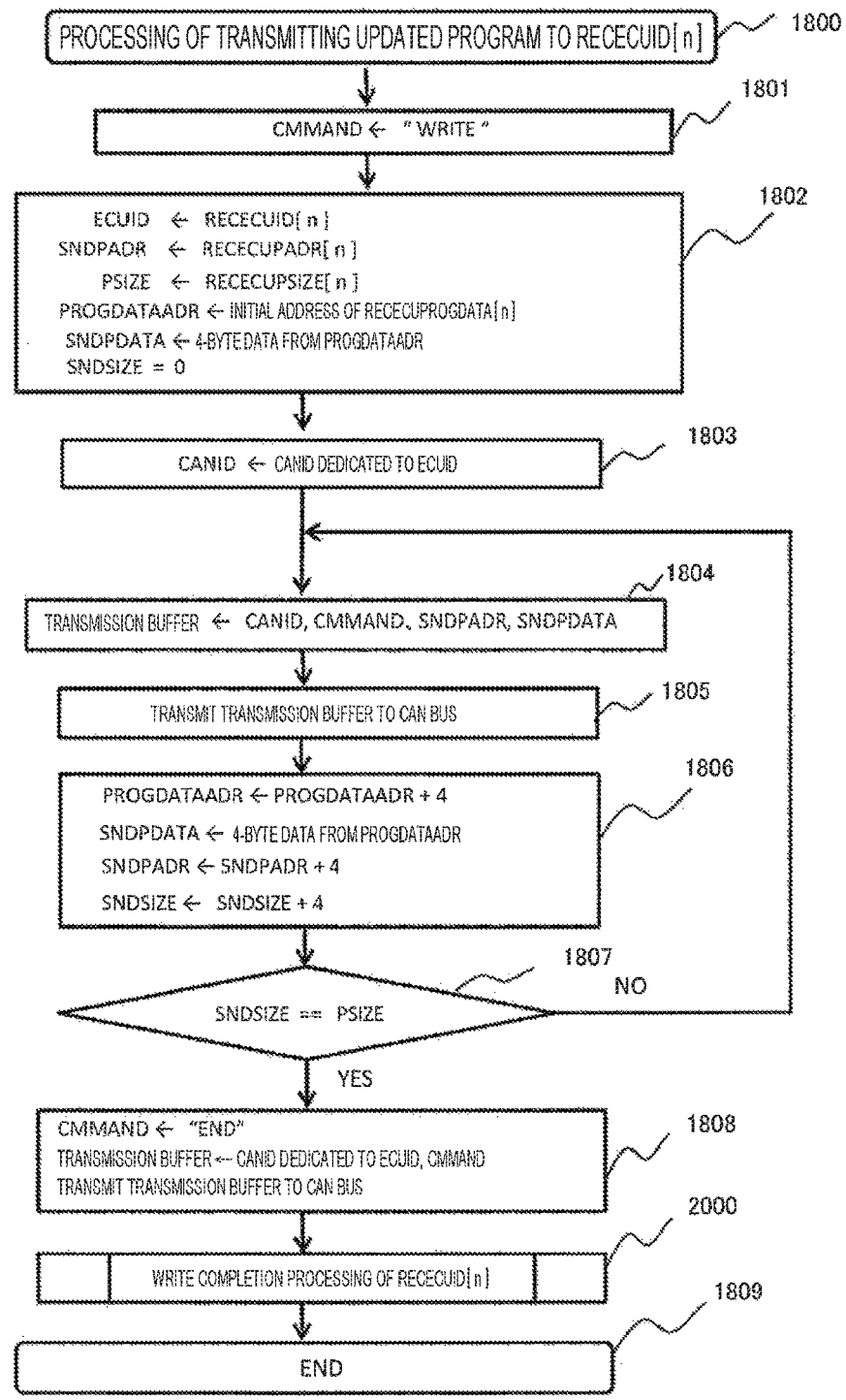
FIG. 18 is a flowchart showing processing of a relay device which transmits an updated program to a vehicle-mounted control device indicated by a vehicle-mounted control device number RECECUID[n].

In FIG. 18, the processing is performed as follows: the relay device transmits the updated program and the updated data to the vehicle-mounted control device of RECECUID[n] in units of 4 bytes, receives the write completion result from the vehicle-mounted control device after the transmission completion, and memorizes the result.

First, in 1801, a command "WRITE" is set to variable CMMAND. Then, in 1802, RECECUID[n] is set to variable ECUID, ERCECUPADR[n] is set to variable SNDPADR, RECECUPSIZE[n] is set to variable PSIZE, a head address of RECECUPROGDATA[n] is set to variable PROGDATAADR, 4-byte data from PROGDATAADR is set to variable SNDPDATA, and 0 is set to variable SNDSIZE. Then, in 1803, CANID dedicated to the vehicle-mounted control device ECUID of the transmission destination is set to variable CANID. In 1804, variable CANID is set to a CANID field of the transmission buffer, variable CMMAND is set to a CMD field of the transmission buffer, variable SNDPADR is set to a PADR field of the transmission buffer, and variable SNDPDATA is set to a DATA field of the transmission buffer. Then, in 1805, the contents of the transmission buffer are transmitted to the CAN bus. In the above processing, the first write address of the updated program and the updated data and the first 4-byte data of the updated program and the updated data could be transmitted to the vehicle-mounted control device. Then, in 1806, next 4-byte data of the updated program and the updated data are prepared for transmission. That is, variable PROGDATAADR is incremented by 4, 4-byte data from an address indicated by variable PROGDATAADR are set to variable SNDPDATA, variable SNDPADR is increased by 4, and variable SNDSIZE is also increased by 4. Therefore, next 4-byte data of the updated program and the updated data and the write address can be respectively set. Then, in 1807, it is checked whether variable SNDSIZE is matched with variable PSIZE, so as to check whether the updated program and the updated data have been completely transmitted to the corresponding vehicle-mounted control devices. If NO, the processing is returned back to 1804 and the transmission processing is repeated. If YES, 1808 is executed, "END" meaning the transmission completion is set to variable CMMAND, CANID dedicated to ECUID is set to a CANID field of the transmission buffer, variable CMMAND is set to a CMD field of the transmission buffer, and the contents of the transmission buffer are transmitted to the CAN bus. In the above, since the updated program and the updated data have been completely transmitted to the vehicle-mounted control device of RECECUID[n], the write completion processing 2000 of RECECUID[n] is executed and the processing is ended. Since the processing of FIG. 18 is executed from 1800 of FIG. 15, as can be seen from 1511 of FIG. 15, it can be seen that the entire updated program and updated data are transmitted.

The processing of transmitting the updated program and the updated data from the relay device to the vehicle-mounted control device has been described. Next, the write processing of the vehicle-mounted control device which receives the updated program and the updated data will be described with reference to FIG. 19. Also, after that, the write completion processing 2000 of RECECUID[n] and the write completion processing 2100 will be described.

The write processing of the vehicle-mounted control device RECECUID[n] of FIG. 19 is started by the reception interrupt.

The present program performs the processing of writing the updated program and the updated data to the control program and data storage area 8A03 of the vehicle-mounted control device of FIG. 8A. However, since the present area is the flash memory, it is necessary to delete the program and data already written in the present area. However, in the present embodiment, the deletion processing has no relation to the essence of the present invention and descriptions thereof will be omitted for simplicity. In 1901, data of a CANID field of a reception buffer is set to variable CANID, and data of a CMD field of the reception buffer is set to a variable CMAND. Then, in 1902, it is checked whether variable CANID is matched with CANID of the own vehicle-mounted control device. If NO, the data is determined as data to be transmitted to other vehicle-mounted control devices and the processing is ended. If YES, it is checked in 1903 whether variable CMAND is "WRITE". If YES, variable CMAND is determined as a write command. In 1904, data SNDPADR of a PADR field of the reception buffer is set to variable SNDPADR, and data SNDPDATA of a DATA field of the reception buffer is set to variable SNDPDATA. Next, 1905 to 1907 are processing of rewriting the control program and the data of 8A03 of FIG. 8A. First, in 1905, variable SNDPADR is set to a write address setting register MADR. In 1906, variable SNDPDATA is set to a write data setting register MDATA. In 1907, a write command WRITE is set to a command register MCOM. Since the execution of the writing is started at a time point when the WRITE command is set to the MCOM register, variable SNDPDATA which holds the 4 bytes of the updated program and the updated data are written to the address SNDPADR of the area 8A03. Then, in 1908, in order to check whether the writing is successful, it is determined whether an error ERROR has been detected in a status register ROMStatus. If YES, it means that the writing of the 4 bytes is failed. Thus, in 1909, "NG" is set to variable ERRStatus and the processing is ended. If NO, the writing of the 4 bytes is successful, and thus, the processing is ended. The above-described processing is processing of writing the 4 bytes, but the present processing is processing performed based on the data transmitted in 1805 of FIG. 18. Since the processing of transmitting the entire updated program and updated data is repeated in 1807 of FIG. 18, the present processing is also repeated at every reception. On the other hand, if NO in 1903, it is checked whether the command transmitted from the relay device after the updated program and the updated data have been completely written is "END", and the write completion of the corresponding control device is notified to the relay device. First, in 1910, it is checked whether variable CMMAND is "END", and if NO, the processing is ended. If YES, CANID dedicated to the relay device is set to variable CANID in 1911, "RESPONSE" meaning a response of "END" is set to variable CMMAND in 1912, variable ERRStatus is set to variable SNDPDATA in 1913, variable CANID is set to the CANID field of the transmission buffer in 1914, variable CMMAND is set to the CMD field of the transmission buffer, variable SNDPDATA is set to the DATA field of the transmission buffer, and then, the contents of the transmission buffer are transmitted to the CAN bus in 1915. In the above, since the processing of writing the 4 bytes and the result thereof are notified to the relay device, the operation mode of the vehicle-mounted control device is changed from the repro mode to the normal operation mode in 1916, and the PowerKeep signal is turned off in 1917 to end the processing.

Next, the write completion processing 2000 of RECECUID[n] of FIG. 18 will be described in detail.

Figure 20:
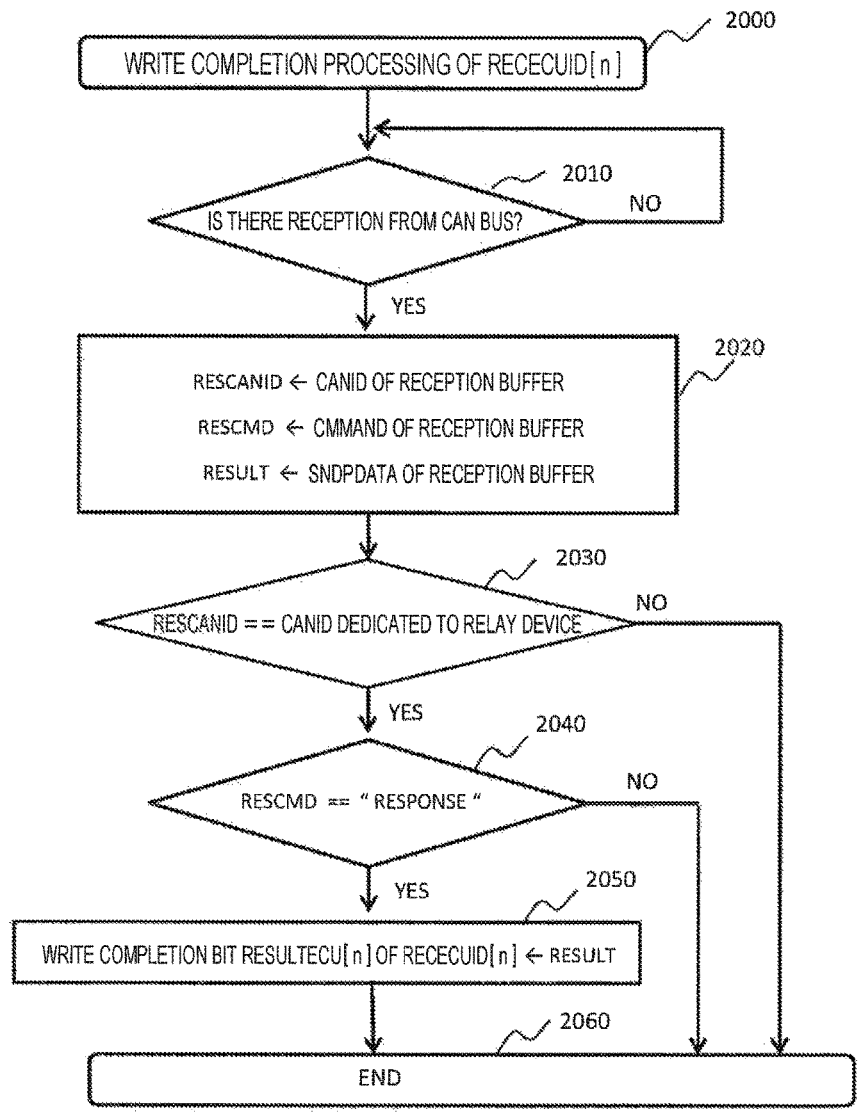
FIG. 20 is a flowchart showing processing of a relay device which stores a write completion result from a vehicle-mounted control device, which is indicated by a vehicle-mounted control device number RECECUID[n], to an array RESULTECU[n].

FIG. 20 is a write completion flow of RECECUID[n]. In 2010, it is checked whether there is a reception from the CAN bus. This is processing of checking the reception of the "RESPONSE" response from the vehicle-mounted control device RECECUID[n]. If YES, in 2020, the data CANID of the CANID field of the reception buffer is set to variable RESCANID, the data CMMAND of the CMD field of the reception buffer is set to variable RESCMD, and the data SNDPDATA of the DATA field of the reception buffer is set to variable RESULT. Then, in 2030, it is checked whether variable CANID is matched with CANID dedicated to the relay device. If NO, there is no received data of the relay device, and thus, the processing is ended. If YES, it is checked in 2040 whether variable RESCMD is matched with the command "RESPONSE". If NO, the processing is ended. If YES, the write completion result is stored in variable RESULT. Therefore, in 2050, variable RESULT is stored to a write completion bit array RESULTECU[n] of RECECUID, and the processing is ended. In the above, the updated program and updated data write completion result of RECECUID[n] is stored in RESULTECU[n].

Figure 15:
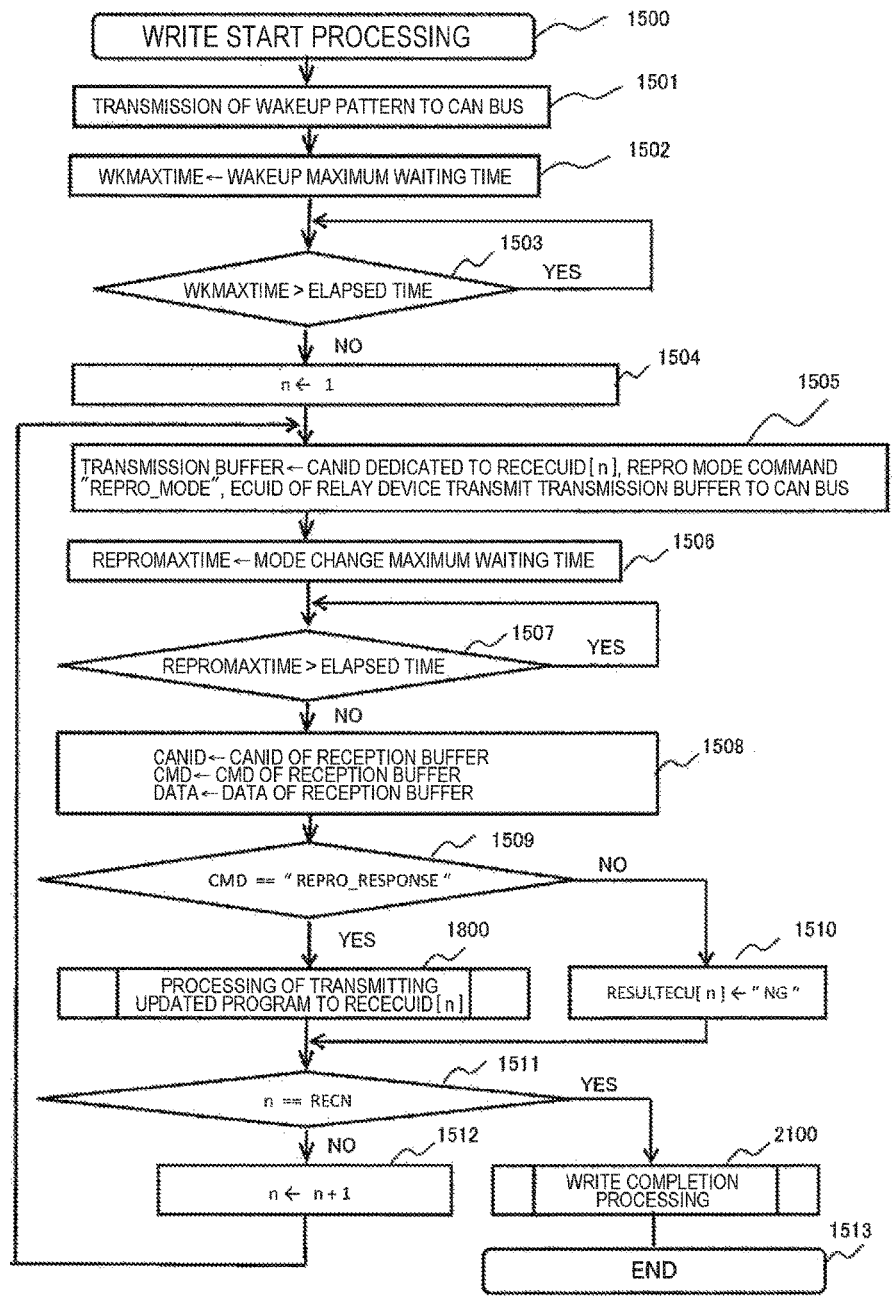
FIG. 15 is a flowchart showing write start processing.

As can be seen if looking back at the entire processing configuration, the write start is initiated from the processing of FIG. 14, and the processing of FIG. 15 is executed when the write start condition is satisfied. Here, the processing of calling the processing of writing the entire updated program and updated data to the vehicle-mounted control device is repeated. The processing of transmitting the updated program to RECECUID[n] of FIG. 18 is present during the repetition. Furthermore, the write completion processing of RECECUID[n] of FIG. 20 is executed during the processing of FIG. 18. Therefore, the write completion processing of RECECUID[n] of FIG. 20 is executed with respect to the entire vehicle-mounted control devices corresponding to the updated program and the updated data.

Figure 21:
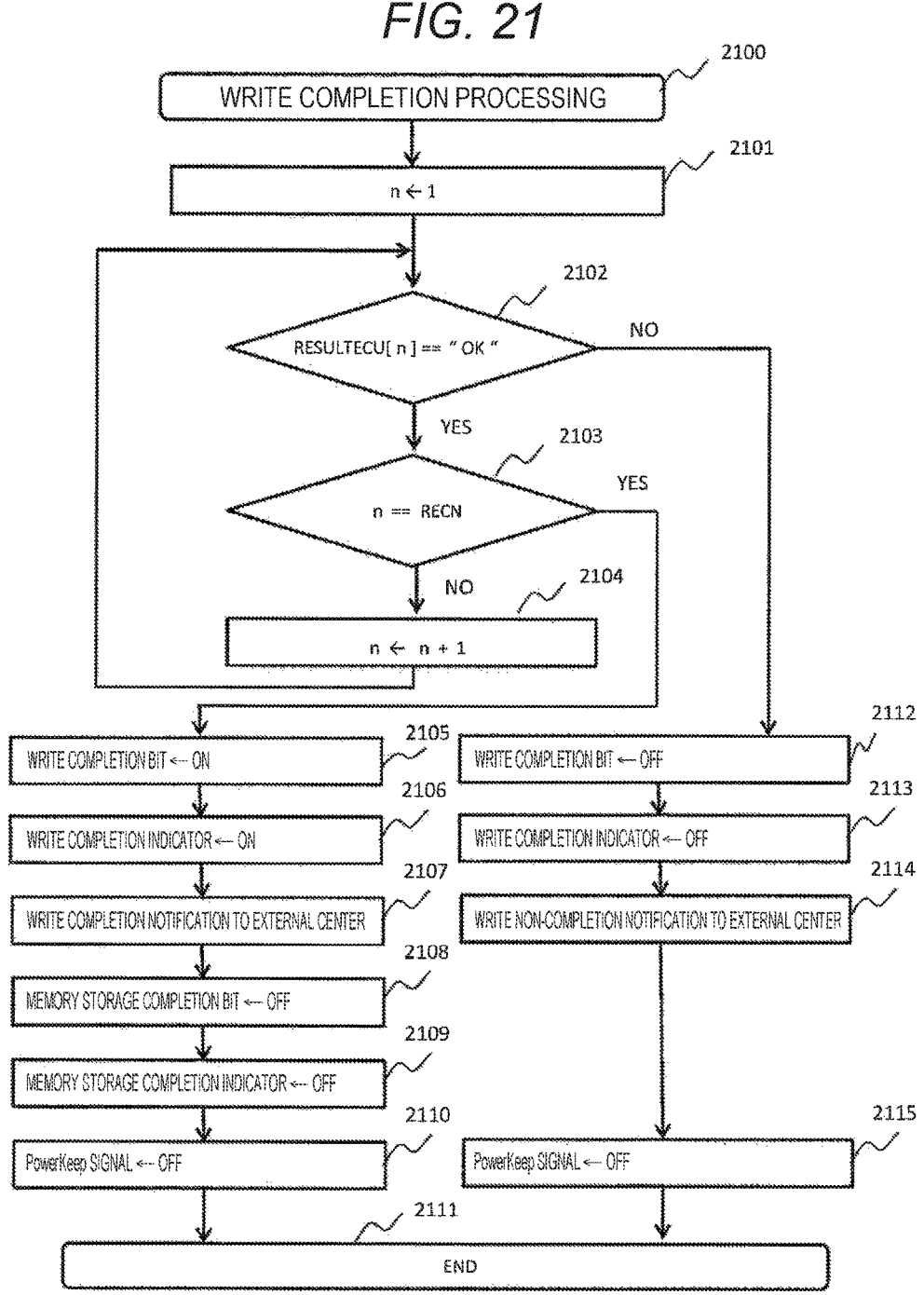
FIG. 21 is a flowchart showing write completion processing of a relay device.

Next, in FIG. 15, the write completion processing 2100 performed after the entire updated program and updated data has been completed written to the corresponding vehicle-mounted control device will be described with reference to FIG. 21.

1 is set to variable n in 2101, and it is checked in 2102 whether the write completion bit RESULTECU[n] of the vehicle-mounted control device of RECECUID[n] is "OK". If NO, it means an occurrence of a write failure. Thus, the write completion bit described with reference to FIG. 7 is set to off in 2112, a write completion indicator is turned off in 2113, a write incompletion notification meaning a write failure is performed to the external center in 2114, and finally, the PowerKeep signal of the relay device is turned off in 2115 to end the processing. On the other hand, if YES in 2102, it is checked whether variable n is matched with RECN, and if NO, variable n is incremented and 2102 is repeated. If YES, it means that the result of the entire write processing is "OK". Thus, a write completion bit is set to on in 2105, a write completion indicator is turned on in 2106, a write completion notification meaning that the write completion has been normally ended is performed to the external center in 2107, a memory storage completion bit is set to off in 2108 because the entire processing has been ended, and a memory storage completion indicator is turned off in 2109, and the PowerKeep signal of the relay device is turned off in 2110 to end the processing.

Next, the embodiment of the case where the write start is implemented by the write start command button mounted on the vehicle will be described in detail.

In the present embodiment, the detailed processing operation of the overview of the write processing by the write button in FIG. 10 will be described. However, since the memory storage completion processing of the relay device of FIG. 11 has already been described in detail, the processing subsequent to 1010 of FIG. 10 will be described.

Figure 22:
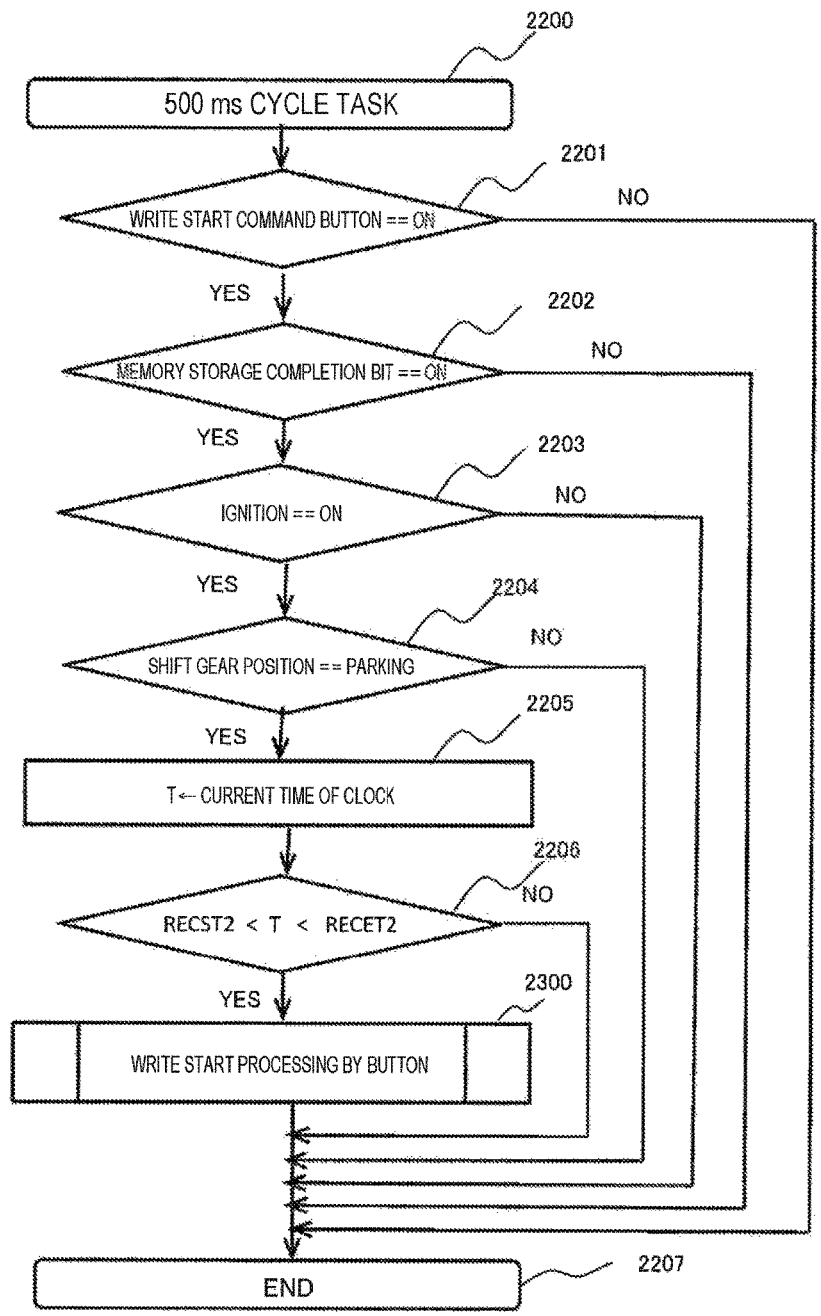
FIG. 22 is a flowchart showing write start command processing by a write start command button.

FIG. 22 is a detailed flow of a write start command processing by a write start command button. The present processing program 2200 is a program which is started every 500 ms. When the present program is started, it is checked in 2201 whether the write start command button is turned on, and if NO, the program is ended. If YES, it is checked in 2202 whether a memory storage completion bit is turned on, and if NO, the program is ended. If YES, operations are different according to different embodiments, and thus, the operations will be described below.

In one embodiment, 2203, 2204, 2205, and 2206 are omitted and 2300 is executed. That is, the write start processing by the button is executed and the processing is ended.

In one embodiment, it is checked in 2203 whether an ignition is turned on. If NO, the processing is ended. If YES, it is checked in 2204 whether a shift gear position is in a parking position, and if NO, the processing is ended. If YES, 2205 and 2206 are omitted, and the write start processing 2300 by the button is executed and the processing is ended.

In one embodiment, 2203 and 2204 are omitted and 2205 and 2206 are executed. In 2205, a current time is obtained from a vehicle-mounted clock and is set to variable T. In 2206, it is checked whether variable T is within a range between a start time RECST2 and an end time RECET2 of a second time slot, and if NO, the processing is ended. If YES, the write start processing 2300 by the button is executed and the processing is ended.

In one embodiment, it is checked in 2203 whether the ignition is turned on. If NO, the processing is ended. If YES, it is checked in 2204 whether the shift gear position is the parking, and if NO, the processing is ended. If YES, the current time from the vehicle-mounted clock is set to variable T in 2205. It is checked in 2206 whether variable T is within the range between the start time RECST2 and the end time RECET2 of the second time slot, and if NO, the processing is ended. If YES, the write start processing 2300 by the button is executed and the processing is ended.

The operations of the embodiments have been described above.

Figure 23:
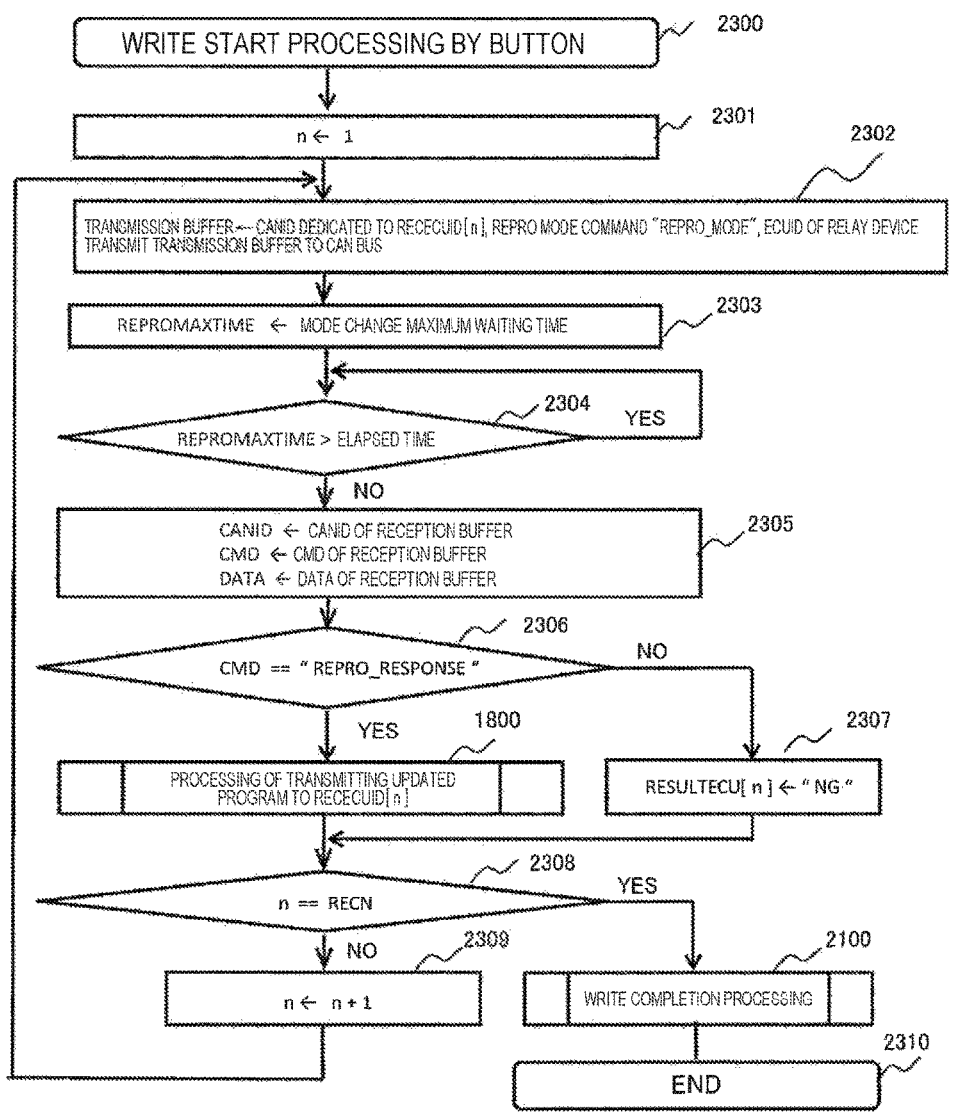
FIG. 23 is a flowchart showing write start processing by a button.

Next, the write start processing by the button as shown in FIG. 23 will be described in detail.

In 2301, 1 is set to variable n. In 2302, CANID dedicated to RECECUID[n] is set to the CANID field of the transmission buffer, the repro mode command "REPRO_MODE" is set to the CMD field of the transmission buffer, ECUID of the relay device is set to the DATA field of the transmission buffer, and the contents of the transmission buffer are transmitted to the CAN bus. In the above processing, since the ignition is on, the power of the vehicle-mounted control device is on. Therefore, the relay device does not transmit a wakeup pattern and transmits a repro mode transition request command "REPRO_MODE". Then, a mode change maximum waiting time is set to variable REPROMAX-TIME in 2303, and the processing of waiting until the elapse of the REPROMAXTIME time is performed in 2304. A case where the REPROMAXTIME time has elapsed becomes NO. In 2305, the data CANID of the CANID field of the reception buffer is set to variable CANID, the data CMD of the CMD field of the reception buffer is set to variable CMD, and the data DATA of the DATA field of the reception buffer is set to variable DATA. Then, in 2306, it is checked whether variable CMD is matched with "REPRO_RESPONSE". If NO, it is determined as abnormal and "NG" is set to RESULTECU[n] in 2307. If YES, "processing of transmitting the updated program to RECECUID[n]" of 1800 is executed, and it is checked in 2308 whether variable n is matched with RECN. If NO, the entire updated program and updated data are not transmitted. Therefore, in 2309, variable n is incremented and 2302 is repeated. If YES in 2308, the write completion processing 2100 is performed and the processing is ended. The above-described processing 2301 to 2310 is the same as 1504 to 1513 of FIG. 15. Therefore, since the "processing of transmitting the updated program to RECECUID[n]" of 1800 and the write completion processing of 2100 need not be described again, descriptions thereof will be omitted.

The embodiments and the operations thereof have been described above.

As described above, according to the present invention, since the relay device mounted on the vehicle can receive the updated program data transmitted from the external center when the ignition is in an on state, without regard to the control operation of the vehicle-mounted control device which is related to traveling, the updated program data can be stored without the driver's feeling inconvenience.

Also, the processing of writing the updated program and the updated data can update the control program and data of the vehicle control device in the promised time slot when the driver of the vehicle is not in the vehicle, when the vehicle is parked at home or other parking lot, or even when the ignition is in an off state at midnight.

Also, in a case where the driver of the vehicle is in the vehicle, the driver can perform the writing in a convenient time by pressing the write start command button or can perform the writing in a limited time slot promised with an owner.

As described above, the updated program and the updated data can be written to the vehicle-mounted control device quickly and without the driver's feeling inconvenience.

REFERENCE SIGNS LIST 100 external center
101 radio relay station
120 relay device
121 wireless transceiver
122, 131, 141, 151 microcontroller
130, 140, 150 vehicle-mounted control device
160 vehicle-mounted network
170 ignition switch

The invention claimed is:

1. A vehicle-mounted program writing device, comprising:
    a plurality of vehicle-mounted control devices which control operations of vehicle-mounted devices by using a control program; and
    a relay device which receives updated program data transmitted from an external center and stores the updated program data in a memory, the updated program data including updated programs and updated data for the vehicle-mounted control devices,
    wherein a vehicle-mounted control device has a normal operation mode of executing the control program and a repro mode of rewriting the control program to the updated program,
    the vehicle-mounted control device and the relay device are connected through a vehicle-mounted network,
    the relay device has a memory storage completion indicator, a write start command button, and a write completion indicator,
    the relay device turns on the memory storage completion indicator when the reception of the updated program data for the plurality of vehicle-mounted control devices transmitted from the external center is completed when an ignition is in an on state,
    if the write start command button is turned on when the memory storage completion indicator is in an on state,
    the relay device starts the writing of the updated programs and the updated data to the vehicle-mounted control devices,
    the relay device turns on the write completion indicator after the write completion, and
    if the memory storage completion indicator is in off state, the relay device does not execute the writing of the updated programs and the updated data even when the write start command button is turned on.

2. The vehicle-mounted program writing device according to claim 1, wherein, if the write start command button is turned on when the memory storage completion indicator is in an on state, the ignition is in an on state, and a shift gear position of the vehicle is in a parking position,
    the writing of the updated programs and the updated data to the vehicle-mounted control devices is started,
    the write completion indicator is turned on after the write completion, and
    if the memory storage completion indicator is in off state, if the ignition is in an off state, or if the shift gear of the vehicle is in a position other than the parking, the writing of the updated programs and the updated data is not executed even when the write start command button is turned on.

3. A vehicle-mounted program writing device, comprising:
    a plurality of vehicle-mounted control devices which control operations of vehicle-mounted devices by using a control program; and
    a relay device which receives updated program data transmitted from an external center and stores the updated program data in a memory, the updated program data including: i) updated programs and updated data for the vehicle-mounted control devices,
    wherein a vehicle-mounted control device has a normal operation mode of executing the control program and a repro mode of rewriting the control program to the updated program,
    the vehicle-mounted control device and the relay device are connected through a vehicle-mounted network,
    the relay device has a memory storage completion indicator, a write start command button, and a write completion indicator,
    the relay device has a means for turning on the memory storage completion indicator when the reception of the updated program data for the plurality of vehicle-mounted control devices transmitted from the external center is completed when an ignition is in an on state,
    a means for starting the writing of the updated programs and the updated data to the vehicle-mounted control devices when the memory storage completion indicator is turned on and a time when the write start command button is turned on is within a range of a second time slot,
    a means for turning on the write completion indicator after the write completion, and
    a means for not executing the writing when the memory storage completion indicator is in off state or when the time when the write start command button is turned on is out of the range of the second time slot.

4. The vehicle-mounted program writing device according to claim 3, wherein the vehicle-mounted program writing device has a means for starting the writing of the updated programs and the updated data to the vehicle-mounted control devices when the memory storage completion indicator is turned on, the ignition is in an on state, a shift gear position of a vehicle is in a parking position, and the time when the write start command button is turned on is within the range of the second time slot,

- a means for turning on the write completion indicator after the write completion, and
- a means for not executing the writing when the memory storage completion indicator is in off state, when the ignition is in an off state, when the shift gear of the vehicle is in a position other than the parking, or when the time when the write start command button is turned on is out of the range of the second time slot.

\* \* \* \* \*